(12) United States Patent
Setlur et al.

(10) Patent No.: US 12,379,831 B2
(45) Date of Patent: Aug. 5, 2025

(54) VISUAL AUTOCOMPLETION FOR GEOSPATIAL QUERIES

(71) Applicant: Tableau Software, LLC, Seattle, WA (US)

(72) Inventors: Vidya Raghavan Setlur, Portola Valley, CA (US); Sarah Battersby, Seattle, WA (US); Tracy Wong, Burnaby (CA)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 18/231,226

(22) Filed: Aug. 7, 2023

(65) Prior Publication Data

US 2023/0376185 A1   Nov. 23, 2023

Related U.S. Application Data

(63) Continuation of application No. 17/588,997, filed on Jan. 31, 2022, now Pat. No. 11,720,240.
(Continued)

(51) Int. Cl.
  *G06F 3/04842* (2022.01)
  *G06F 3/0483* (2013.01)
  (Continued)

(52) U.S. Cl.
  CPC ...... *G06F 3/04842* (2013.01); *G06F 16/9537* (2019.01); *G06F 40/205* (2020.01); *G06F 40/284* (2020.01); *G06F 3/0483* (2013.01)

(58) Field of Classification Search
  None
  See application file for complete search history.

(56) References Cited

U.S. PATENT DOCUMENTS

| | | | |
|---|---|---|---|
| 6,564,213 B1 * | 5/2003 | Ortega ............... | G06F 16/3322 |
| | | | 707/999.005 |
| 10,394,802 B1 * | 8/2019 | Porath ................. | G06F 16/906 |
| | | (Continued) | |

OTHER PUBLICATIONS

Setlur, Office Action, U.S. Appl. No. 17/588,997, Nov. 25, 2022, 15 pgs.

(Continued)

*Primary Examiner* — Haimei Jiang
(74) *Attorney, Agent, or Firm* — Morgan, Lewis & Bockius LLP

(57) ABSTRACT

A computer system receives a natural language input directed to a data source. In response to receiving the natural language input, and in accordance with a determination that the natural language input specifies an incomplete natural language command directed to the data source, the computer system presents a map widget for selecting geospatial data points from the data source. The map widget includes a map having a plurality of predetermined geographic regions. The computer system receives user specification of a user-defined region in the map included in the map widget. In accordance with receiving the user specification and based on a coverage metric computed for the plurality of geographic regions, the computer system selects one or more geographic regions. The computer system completes the natural language command with the selected geographic regions. The computer system generates and displays a map data visualization according to the completed natural language command.

19 Claims, 26 Drawing Sheets

Related U.S. Application Data

(60) Provisional application No. 63/212,710, filed on Jun. 20, 2021.

(51) Int. Cl.
    *G06F 16/9537*     (2019.01)
    *G06F 40/205*     (2020.01)
    *G06F 40/284*     (2020.01)

(56) References Cited

U.S. PATENT DOCUMENTS

| | | | | |
|---|---|---|---|---|
| 10,515,121 | B1* | 12/2019 | Setlur | G10L 15/1815 |
| 11,138,249 | B1* | 10/2021 | Tosik | G06F 16/3347 |
| 11,210,333 | B2* | 12/2021 | Setlur | G06F 16/248 |
| 11,720,240 | B1* | 8/2023 | Setlur | G06F 40/284 |
| | | | | 715/765 |
| 2004/0243593 | A1* | 12/2004 | Stolte | G06F 40/177 |
| 2008/0010605 | A1* | 1/2008 | Frank | G06F 16/29 |
| | | | | 715/765 |
| 2008/0027985 | A1* | 1/2008 | Kasperkiewicz | G06F 16/29 |
| 2008/0249984 | A1* | 10/2008 | Coimbatore | G06F 16/951 |
| 2009/0210388 | A1* | 8/2009 | Elson | G06F 16/29 |
| 2011/0145286 | A1* | 6/2011 | LaRowe | G06F 16/951 |
| | | | | 715/705 |
| 2014/0047381 | A1* | 2/2014 | Fan | G06F 3/0482 |
| | | | | 715/800 |
| 2015/0007074 | A1* | 1/2015 | Mackinlay | G06F 3/04817 |
| | | | | 715/765 |
| 2016/0274781 | A1* | 9/2016 | Wilson | G06F 16/29 |
| 2017/0177710 | A1* | 6/2017 | Burlik | G01C 21/3667 |
| 2017/0300470 | A1* | 10/2017 | Khamis | G06F 40/242 |
| 2017/0308571 | A1* | 10/2017 | McCurley | G06F 16/243 |
| 2018/0039399 | A1* | 2/2018 | Kaltegaertner | G06F 3/04847 |
| 2019/0340211 | A1* | 11/2019 | Linda | G06F 16/909 |
| 2019/0361927 | A1 | 11/2019 | Hampton et al. | |
| 2020/0089700 | A1* | 3/2020 | Ericson | G06F 40/30 |
| 2020/0089760 | A1* | 3/2020 | Ericson | G06F 3/04812 |
| 2020/0110779 | A1* | 4/2020 | Setlur | G06F 3/0484 |
| 2020/0110803 | A1* | 4/2020 | Djalali | G06F 16/90332 |
| 2020/0351655 | A1 | 11/2020 | Sunkavally et al. | |
| 2021/0349950 | A1* | 11/2021 | Setlur | G06F 40/30 |
| 2021/0365174 | A1* | 11/2021 | Ellis | G06F 1/1626 |

OTHER PUBLICATIONS

Setlur, Notice of Allowance, U.S. Appl. No. 17/588,997, Mar. 15, 2023, 10 pgs.

Setlur Vidya vsetlur@tableau.com et al., "Sneak Pique: Exploring Autocompletion as a Data Discovery Scaffold for Supporting Visual Analysis," Proceeding of the 33rd Annual ACM Symposium on User Interface Software and Technology, ACMPUB27, New York, NY, USA, Oct. 20, 2020, pp. 966-978, XP058726762, DOI: 10.1145/3379337.3415813, ISBN; 978-1-4503-7514-6, 13 pgs.

Soylu Ahmet et al., "OptiqueVQS: A visual query system over Ontologies for Industry," Semantic Web [Online] vol. 9, No. 5, Aug. 27, 2018, pp. 627-660, XP055955703, retrieved from https://www.semantic-web-journal.net/system/files/swj1568, 35 pgs.

Tableau Software, LLC, International Search Report and Written Opinion, PCT/US2022/032448, Sep. 8, 2022, 13 pgs.

\* cited by examiner

1218 — Determine if the first user input specifies an incomplete natural language command by parsing the first user input to check for grammar parse tree errors.

Figure 12B

1220 — Determine if the first user input specifies an incomplete natural language command by parsing the first user input to identify place-related tokens.

Figure 12C

1222 — The second user input is either a rectangular selection or a free draw selection.

Figure 12D

1224 — The map widget includes an aggregated preview of data from the data source.

1226 — The aggregated preview includes hexbin-based preview that displays regions of a map as hexagons.

1228 — The map widget further includes a detailed base map for additional spatial context.

Figure 12E

VISUAL AUTOCOMPLETION FOR GEOSPATIAL QUERIES

RELATED APPLICATIONS

This application is a continuation of U.S. patent application Ser. No. 17/588,997, filed Jan. 31, 2022, entitled "Visual Autocompletion for Geospatial Queries," which claims priority to U.S. Provisional Application Ser. No. 63/212,710, filed Jun. 20, 2021, entitled "Visual Autocompletion for Geospatial Queries," each of which is incorporated by reference herein in its entirety.

This application is related to U.S. patent application Ser. No. 15/804,991, filed Nov. 6, 2017, entitled "Systems and Methods of Using Natural Language Processing for Visual Analysis of a Data Set," which is incorporated by reference herein in its entirety.

This application is related to U.S. patent application Ser. No. 16/234,470, filed Dec. 27, 2018, entitled "Analyzing Underspecified Natural Language Utterances in a Data Visualization User Interface," which is incorporated by reference herein in its entirety.

This application is related to U.S. patent application Ser. No. 16/221,413, filed Dec. 14, 2018, entitled "Data Preparation User Interface with Coordinated Pivots," which is incorporated by reference herein in its entirety.

This application is related to U.S. patent application Ser. No. 16/236,611, filed Dec. 30, 2018, entitled "Generating Data Visualizations According to an Object Model of Selected Data Sources," which is incorporated by reference herein in its entirety.

This application is related to U.S. patent application Ser. No. 16/236,612, filed Dec. 30, 2018, entitled "Generating Data Visualizations According to an Object Model of Selected Data Sources," which is incorporated by reference herein in its entirety.

This application is related to U.S. patent application Ser. No. 16/679,234, filed Nov. 10, 2019, entitled "Data Preparation Using Semantic Roles," which is incorporated by reference herein in its entirety.

This application is related to U.S. Provisional Patent Application 62/991,342, filed Mar. 18, 2020, entitled "Incorporating Data Visualizations into Database Conversational Interfaces," which is incorporated by reference herein in its entirety.

TECHNICAL FIELD

The disclosed implementations relate generally to natural language processing, and more specifically to systems, methods, and user interfaces of providing visual autocompletion for geospatial analysis.

BACKGROUND

How many crimes occurred in the city center? And exactly which part of town is the 'city center'? While location is at the heart of many data questions, geographic location can be difficult to specify in natural language (NL) queries. This is especially true when working with fuzzy cognitive regions or regions that may be defined based on data distributions instead of absolute administrative location (e.g., state, country). Information-seeking referring to the notion of place is a prevalent form of human enquiry. Despite the ubiquity of place in information-seeking, the semantics of place is often subjective as the interpretation varies among people and how they relate to place. As users formulate information goals, they often translate vague conceptual knowledge into more concrete descriptions. This translation can be difficult, however, as the 'concrete' description from a user may not match the structure or content of the underlying data. When user input does not match or cannot easily be put into words as an NL query, the search process is often unsatisfactory.

Search interfaces can help with some of these challenges through user interface scaffolds, such as autocompletion. Autocompletion displays in-situ suggestions as users input queries in the flow of their search tasks. These suggestions provide feedback to the user aiding them in generating valid queries with visual cues based on the underlying document corpora.

In visual analysis, place is a basic category often employed to individuate meaningful portions of spatial locations during data exploration. With the proliferation of NL tools for visual analysis, users can express their analytical questions in plain language containing attributes and values from the underlying data source. Similar to web search tools, visual analysis NL interfaces also provide autocompletion to help users formulate queries. These systems can enhance a user's ability to generate NL spatial queries about specific, named locations (e.g., states, provinces, countries). However, these systems do not provide a natural and flexible mode of spatial exploration that better aligns with the vague ways in which people often conceptualize space.

Spatial language is complicated and there are numerous issues with identifying the intended meaning of spatial prepositions and relationships in NL usages. The vagueness and ambiguity of expressing place-related terminology is commonly due to two considerations. First, generic place terms, such as 'area' and 'region', are typically ambiguous in that their meaning is compounded from a number of distinct, but closely related senses. Second, concepts of place are often dependent on other concepts, such as geographic feature types, which are vague themselves.

SUMMARY

The present disclosure describes a system that supports the querying of named regions as well as arbitrary combinations of geographic regions, cognitive regions, or data-driven regions that cannot easily be represented in natural language (NL). For example, vague definitions for places can be expressed in visual autocompletion widgets through specifications of cognitive regions. The system may provide an aggregated view of the data with a map widget to facilitate queries based on data distribution or using contextual spatial information from a detailed base map. In some implementations, the system provides views of the data that include hexadecimal bins that are dual encoded to reflect count using color and size. Some implementations provide a coverage metric to help users assess and refine spatial queries using commonly named administrative geographies as well as data characteristics. In some implementations, the system persists spatial definition of named regions for use in future queries. This ensures consistency in analytics and facilitates comparisons between regions.

In accordance with some implementations, a method supports visual analysis of datasets. The method is performed at a computing system having one or more processors and memory storing one or more programs configured for execution by the one or more processors. The method includes receiving user selection of a data source. The method also includes presenting a natural language interface for analysis of data in the selected data source. The method also includes in response to receiving a first user input to specify an incomplete natural language command directed to the data source: presenting a map widget for selecting geospatial data points from the data source; and in response to receiving a second user input to select a region in the map widget: generating and displaying a map data visualization according to the first user input and the second user input.

In some implementations, the method further includes determining if the first user input specifies an incomplete natural language command by parsing the first user input to check for grammar parse tree errors.

In some implementations, the method further includes determining if the first user input specifies an incomplete natural language command by parsing the first user input to identify place-related tokens.

In some implementations, the second user input is either a rectangular or a free draw selection.

In some implementations, the map widget includes an aggregated preview of data from the data source. In some implementations, the aggregated preview includes a hexbin-based preview that displays regions of a map as hexagons. In some implementations, the map widget further includes a detailed base map for additional spatial context.

In some implementations, the method further includes generating and displaying a linguistic description of data points in the selected region.

In some implementations, the method further includes continuing to display the selected region in the map widget, wherein the map widget is configured to update the data visualization according to user modification of the selected region.

In some implementations, the method further includes receiving and storing a spatial definition of the selected regions for use in future queries. In some implementations, the method further includes: receiving a spatial query directed to the data source; and retrieving the spatial definition to generate and display a response to the spatial query.

In some implementations, the method further includes: generating and displaying a coverage metric for the selected region that helps users assess and refine spatial queries using commonly named administrative geographies as well as data characteristics. In some implementations, the coverage metric represents a confidence level of selecting a particular geography that is computed based on a proportion of data points selected and overlapping geographical area. In some implementations, the geographical areas include one or more regions selected from the group consisting of: counties, states, and countries. In some implementations, the method further includes sorting and displaying various geographical areas based on the coverage metric. In some implementations, the geographical areas are displayed using a gradient color palette according to the coverage metric.

In some implementations, the method further includes generating and displaying a comparison between two user-identified cognitive regions. In some implementations, the comparison includes statistics for minimum, maximum and average values in each of the regions.

Thus, methods, systems, and graphical user interfaces are disclosed that enable users to analyze data.

BRIEF DESCRIPTION OF THE DRAWINGS

For a better understanding of the aforementioned systems, methods, and graphical user interfaces, as well as additional systems, methods, and graphical user interfaces that provide data visualization analytics and data preparation, reference should be made to the Description of Implementations below, in conjunction with the following drawings, in which like reference numerals refer to corresponding parts throughout the figures.

FIGS. 12A-12J provide a flowchart of a method that uses natural language for visual analysis of a dataset, according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
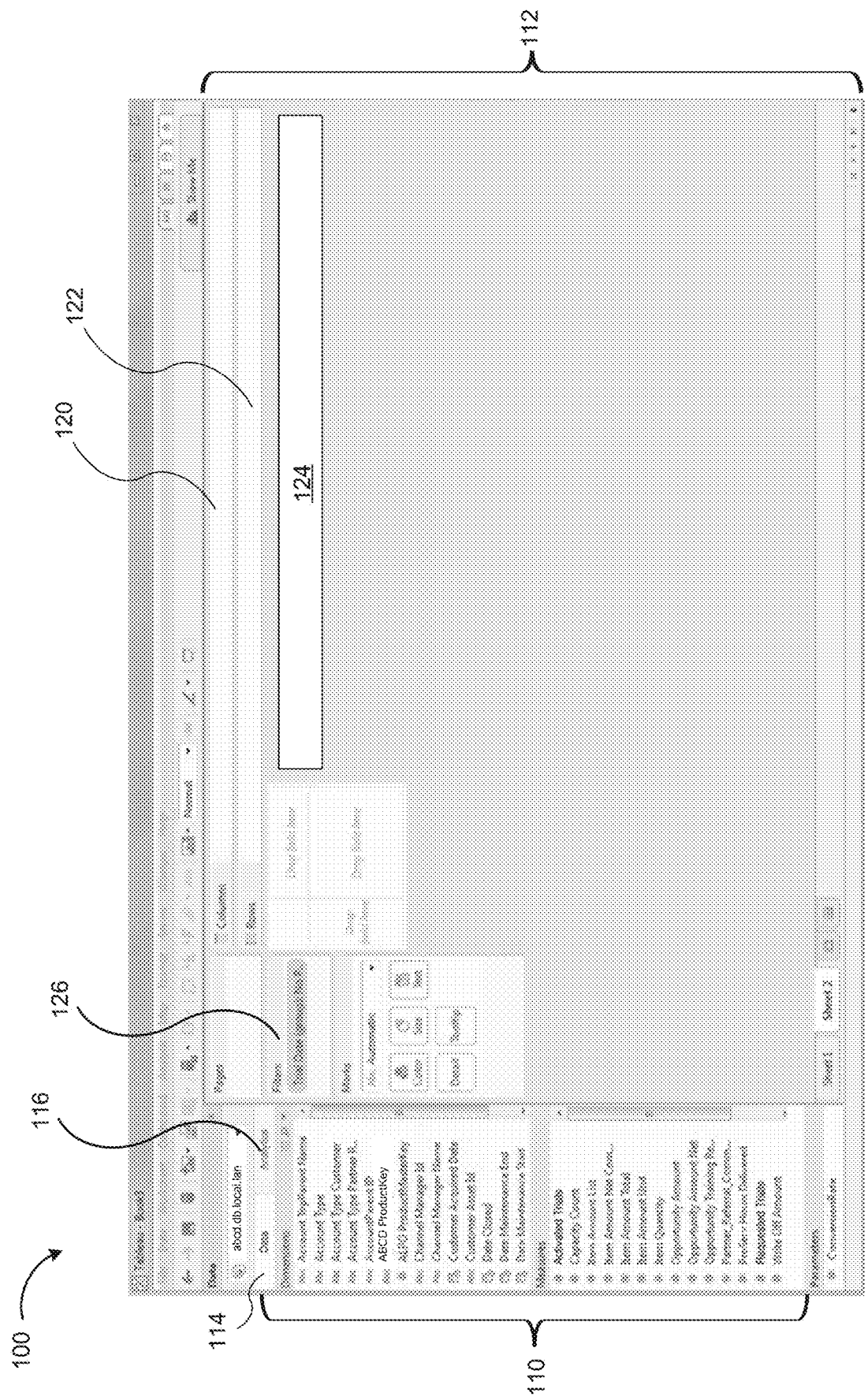
FIG. 1 illustrates an example graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2:
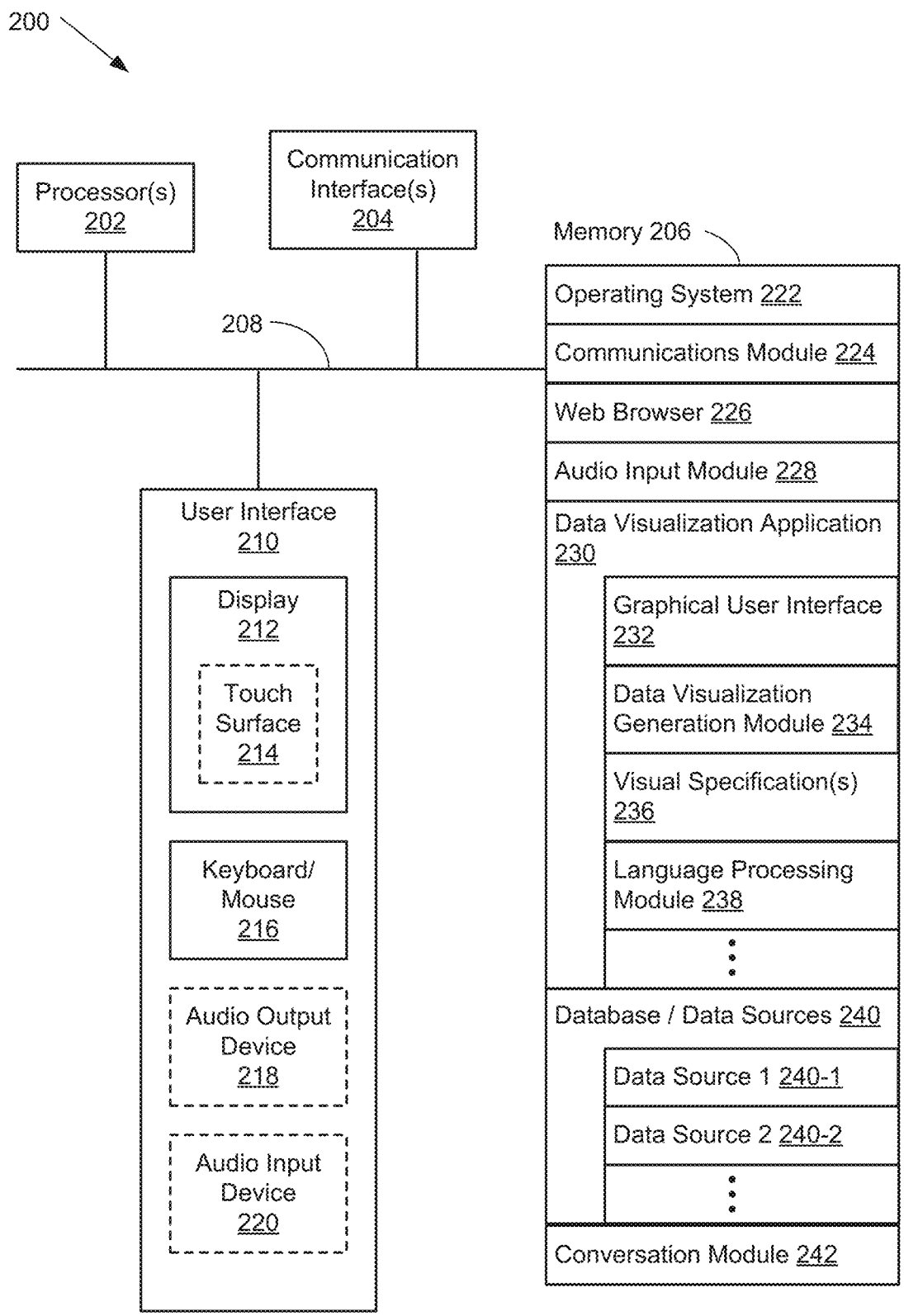
FIG. 2 is a block diagram of a computing device in accordance with some implementations.

FIG. 2 is a block diagram illustrating a computing device 200 that can display the graphical user interfaces 100 in accordance with some implementations. Various examples of the computing device 200 include a desktop computer, a laptop computer, a tablet computer, and other computing devices that have a display and a processor capable of running a data visualization application 222 and/or a data prep application 230. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a data visualization user interface 224 (e.g., the graphical user interface 100) for a user to construct visual graphics and/or ask natural language queries. For example, a user selects one or more data sources 236 (which may be stored on the computing device 200 or stored remotely), selects data fields from the data sources and/or searches for data fields from the data sources that match a natural language query, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application using web pages provided by a web server. In some implementations, the data visualization application 230 includes a language processing module 232 for processing (e.g., interpreting) commands provided by a user of the computing device. In some implementations, the commands are natural language commands (e.g., captured by an audio input device). In some implementations, the language processing module 232 includes sub-modules such as an autocomplete module, a pragmatics module, and/or an ambiguity module. In some implementations, the memory 214 stores metrics and/or scores determined by the language processing module 238. In addition, the memory 214 may store thresholds and other criteria, which are compared against the metrics and/or scores determined by the language processing module 232. For example, the language processing module 232 may determine a relatedness metric (discussed in detail below) for an analytic word/phrase of a received command. Then, the language processing module 232 may compare the relatedness metric against a threshold stored in the memory 214;
- zero or more databases or data sources 236 (e.g., a first data source 236-1 and a second data source 236-2), which are used by the data visualization application 222. In some implementations, the data sources are stored as spreadsheet files, CSV files, XML files, or flat files, or stored in a relational database; and
- a conversation module 242 that processes user input, via a conversational interface (e.g., interfaces described below in reference to FIGS. 3, 4, and 6A-11), and generates text and/or visualization responses based on question types and/or user preferences.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Techniques described herein may be used to design NL input systems for supporting geospatial inquiry involving cognitive regions. The techniques can be used to handle fuzzy geospatial queries. For example, a map widget can be used for autocompleting a query with a user-defined region. The system can also support specifying and saving cognitive regions during analysis. For example, a UI can be used for viewing coverage, fine tuning, and saving cognitive regions for future reference. The system also provides opportunities for supporting richer queries involving cognitive regions. For example, such systems provide more control over spatial resolution, comparisons and recommendations.

According to some implementations, vague definitions for places can be expressed in visual autocompletion widgets through specifications of cognitive regions. Cognitive regions are (approximately) two-dimensional features that people use to understand the (near) earth surface, as well as to reason and communicate about it. These regions are spatial categories that often correspond non-arbitrarily to real entities, properties, and processes, and are created as intellectual or cognitive actions. They are a useful form of regionalization that correspond more readily to the reality of a heterogeneous set of geospatial features surface or serve the needs of a particular geospatial inquiry (e.g., 'The Midwest', 'West Coast', and 'downtown'). They may have irregular boundaries or may align nicely with common administrative boundaries (e.g., one definition of 'West Coast' may encompass all of Washington, Oregon, and California, while another definition of the same named region may simply be the land along the coastline). They may also be identified on-the-fly based on perception of data distributions (e.g., an interesting cluster of data points that are grouped into an arbitrarily shaped area of interest). Cognitive regions are particularly well-suited for NL interaction of geospatial data as they reflect the type of categorical thinking that characterizes human thought and communication. They also may be formed, or re-shaped, on-the-fly through evaluation of data distributions, with the boundaries of a region of interest expanding or contracting based on how data is distributed around the user's initial conceptual boundary.

While the concept of location is fundamental in geography and facilitates categorization of locations and attributes, it can be tricky to make a clear match between the human understanding of a location and a computer mapping of the location. Incorporating cognitive regions or other locations with fuzzy or irregular definitions, is a difficulty and important challenge in NL interfaces. Research suggests four distinct types of regions: administrative, thematic, functional, and cognitive. These geographic regions may have sharp, well-defined, and official boundaries (e.g., states and countries), or vague and more personally relevant, conceptual definitions (e.g., 'downtown' or 'west coast'), or they may be a combination of both (e.g., a neighborhood, which may have an official boundary defined by the city or county, but have a fuzzier border for individuals based on their personal categorization of location). The regions are often fuzzy and vague, with substantial variation between individuals—even for the same named region (e.g., the boundaries of Northern and Southern California). Additionally, another challenge in working with cognitive regions is that the precise definition of a named region may vary based on the way in which it is used or interacted with. The boundary of the 'west coast' may have different meanings depending on the nature of the question being asked about the region—the region defined when asking about best surf breaks and the region used when asking about trends in agricultural production across the west coast will likely be different even though the named region ('west coast') is the same.

Example Geospatial Queries and Expressing Spatial Concepts

Map reading tasks typically fall into three categories—identifying specific information about locations, assessing general information about patterns across an entire region, or to facilitate comparisons between multiple locations or attributes. However, asking questions about location requires that the system clearly define the location in question—for instance, a defined geography or a geographic name that can be attached to a known location (e.g., the term 'California' can be matched to a polygon with a name attribute of 'California'). In writing spatial NL queries, it can be challenging to align a user's name for a location to an absolute geographic definition. This is a classic problem for NL queries as seen in toponym disambiguation research, as well as more broadly in understanding cognitive regionalization. To further the challenges of specifying user locations in NL queries, the location of interest may not even have a common name and may be data driven, for instance, 'the area around that cluster of data points over there' or 'that land area sticking out near the lake'. Sketching has long been thought of as a natural way to express spatial information and has been incorporated into various systems as a support for defining location (e.g., graphical selection in Google maps), spatial relationships, or to query for specific geographic patterns/configurations.

Example Autocompletion and NL Interaction

Search and NL interfaces often employ text or visual autocompletion to help users formulate input queries. The autocompletion suggestions are either displayed contextually as a user types or as the interface reformulates the query into corresponding canonical expressions that represent the system's language. These scaffolds are useful in guiding the user to type syntactically complete and analytically valid queries during data exploration. However, these systems do not provide any preview of the underlying data, resulting in users having to determine questions of analytical interest, while formulating these questions in NL form. Scented widgets in some graphical user interface controls can support data analysis tasks. In such systems, enhanced traditional widgets, such as sliders, combo boxes, and radio buttons, with embedded visualizations to facilitate sensemaking in information spaces.

In some implementations, both textual and visual variants of autocompletion with data previews provide users guidance within the context of NL interaction for visual analysis tasks. Beyond numerical, temporal, and spatial previews of the data, there are additional technical and linguistic challenges specific to supporting a fuller range of a user's spatial NL query needs. For instance, there is a classic geographic information retrieval problem in which the location(s) of interest in the user's query must be identifiable so they can be mapped to defined locations in the database. While some conventional systems can enhance a user's ability to more easily and successfully generate NL spatial queries about specific, named locations, there are still opportunities to better support vague ways in which people often conceptualize locations. Some implementations extend the concept of data-driven scaffolds and support vague definitions for places that can be expressed in visual autocompletion widgets through specifications of cognitive regions.

Some implementations use a web-based architecture with the input NL query processed by an ANTLR parser with a context-free grammar. The parser accesses the dataset through a data manager to handle data query requests. Upon execution, in some implementations, the queries update a D3 Leaflet map. Leaflet is a library for embedding maps on websites. D3 and Leaflet use different APIs for rendering shapes and projecting points. A D3 map may be used to group items together, creating a hashed array that can be accessed using functions like array. The system polls the query as the user is typing and triggers grammar parse tree errors when the query is partially complete. Based on the underlying grammar rules, text- and widget-based auto completion suggestions are shown to the user to help resolve the partial queries. For handling vague cognitive regions in the context of NL interaction, some implementations extend the map widget to help users identify their region of interest in geospatial queries containing place-related tokens, such as 'near', 'in', and 'around'. The system also supports numerical and temporal descriptors in the queries, such as 'large', 'small', and 'recent'. The map widget provides a data preview and enables a user to select a region by either using a rectangular selection (an example of which is shown in FIG. 6C described below) or a free draw selection (an example is shown and described below in reference to FIG. 8).

An example algorithm shown below determines the coverage of the user selected cognitive region in the map widget.

spatial queries, some implementations use a quadtree, a compact data structure that facilitates search operations. Some implementations perform a search on the quadtree to identify the selected points. For each state, the system calculates the proportion of selected points to the total number of data points. Some implementations also calculate the proportion of geographic area for a state that intersects the user-defined region.

Some implementations of the system calculate the proportion values as follows. Some implementations use both selected point proportion and overlapping geographic area proportion values to determine the confidence score. Some implementations use a heuristic approach and may use various individual weights for computing coverage of user selection. In practice, assigning weights 0.65 and 0.35 to the overlapping geographic area and data points respectively, provides reasonable results to reflect likelihood of intentional inclusion of a specific geography. A threshold of 0.2 and higher can be used for choosing geographic areas that the user intended to include in their selection. Confidence score may be calculated using the example equation (1) shown below. In equation (1), $P_{area}$ is the area of selected point proportion and $P_{points}$ is the overlapping geographic area proportion values.

$$\text{confidence score} = P_{area} * 0.65 + P_{points} * 0.35 \qquad (1)$$

Example User Interface

Figure 3:
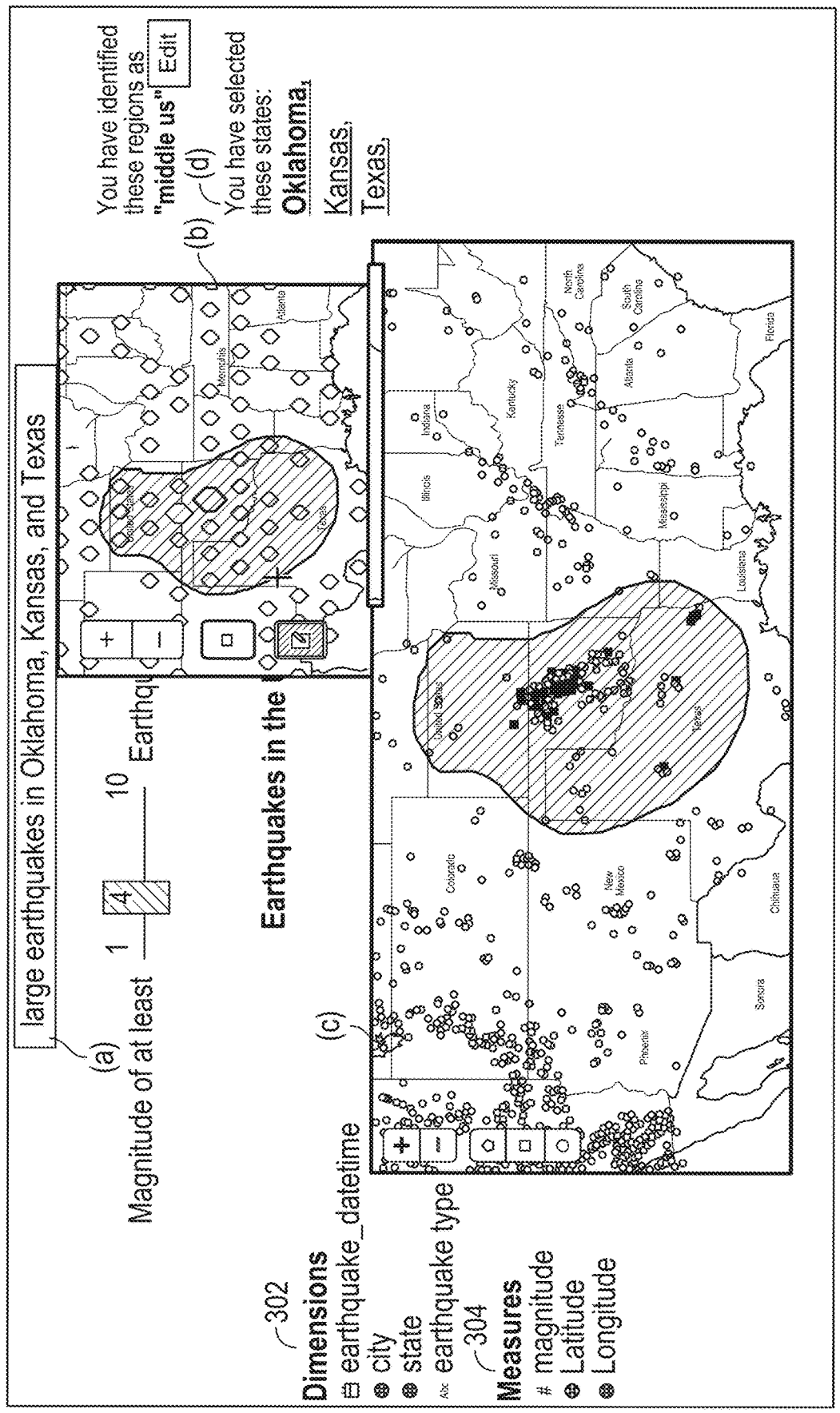
FIG. 3 shows example data visualization interfaces according to some implementations.

FIG. 3 shows an example data visualization interface 300, according to some implementations. As described above, the techniques and example interfaces can be used for querying a fuzzy cognitive region that cannot be represented in natural language. The interface 300 includes an input field for typing queries (a), a map widget for user selection (b), a main map view (c), and a panel to display the results of the targeted cognitive region (d). Example dimensions 302 and measures 304 are shown on the left. When a user selects a region in the map widget (b) to complete a text query (e.g., "large earthquakes in . . . "), the panel (d) displays the various states sorted from the highest confidence score using a gradient color palette. The user can choose to remove places that they do not want to associate with the selection as well as give the region a name in the text field provided.

---

Algorithm 1 Determine coverage of selection
    Input: Polygon object containing user selection
    Output: List of geographies and their normalized scores
    qt is a quadtree data structure to store data points from dataset
1: Visit qt to get selected geo data points and the corresponding admin geography within the user selected region
2: Get selected geo area and the corresponding admin geography unit (e.g. state) within the user selected region
3: Take the aggregation of admin geography from selected geo data points and selected geo area
4: for each admin geography in the aggregated list do
5: Calculate a normalized score given the proportion of geo data points selected and overlapping geo area (Eq. 1)
6: if score < selected threshold then
7: Remove the admin geography from aggregated list
8:    end if
9: end for
10:   Sort the scores of the aggregate list of admin geography in descending order

---

Example Methods for Computing Normalized Scores

When a selection is made on the map widget, some implementations use the proportion of data points selected and the overlapping geographic area to determine the confidence level of selecting a particular geography. Some implementations use states, as county-level geography is too fine a unit and country-level too coarse. To optimize for The named region is saved by the system and can be referenced in future queries (e.g. "what are the recent ones in the Midwest?"). The main map (c) is updated to show the result from the query. Some implementations also support comparisons between two user-identified cognitive regions (e.g., "compare the west and the east"). The system displays statistics minimum, maximum, and average values in each of these regions. Examples of various system behaviors and query examples are shown and described below in reference to FIGS. 3-11, according to some implementations.

Auto-completion is a useful UI mechanism for displaying in-situ suggestions to users as they type. Conventional natural language interfaces provide auto-completion but focus on syntactic query conclusion without providing any guidance as to what is in the underlying data.

Figure 4:
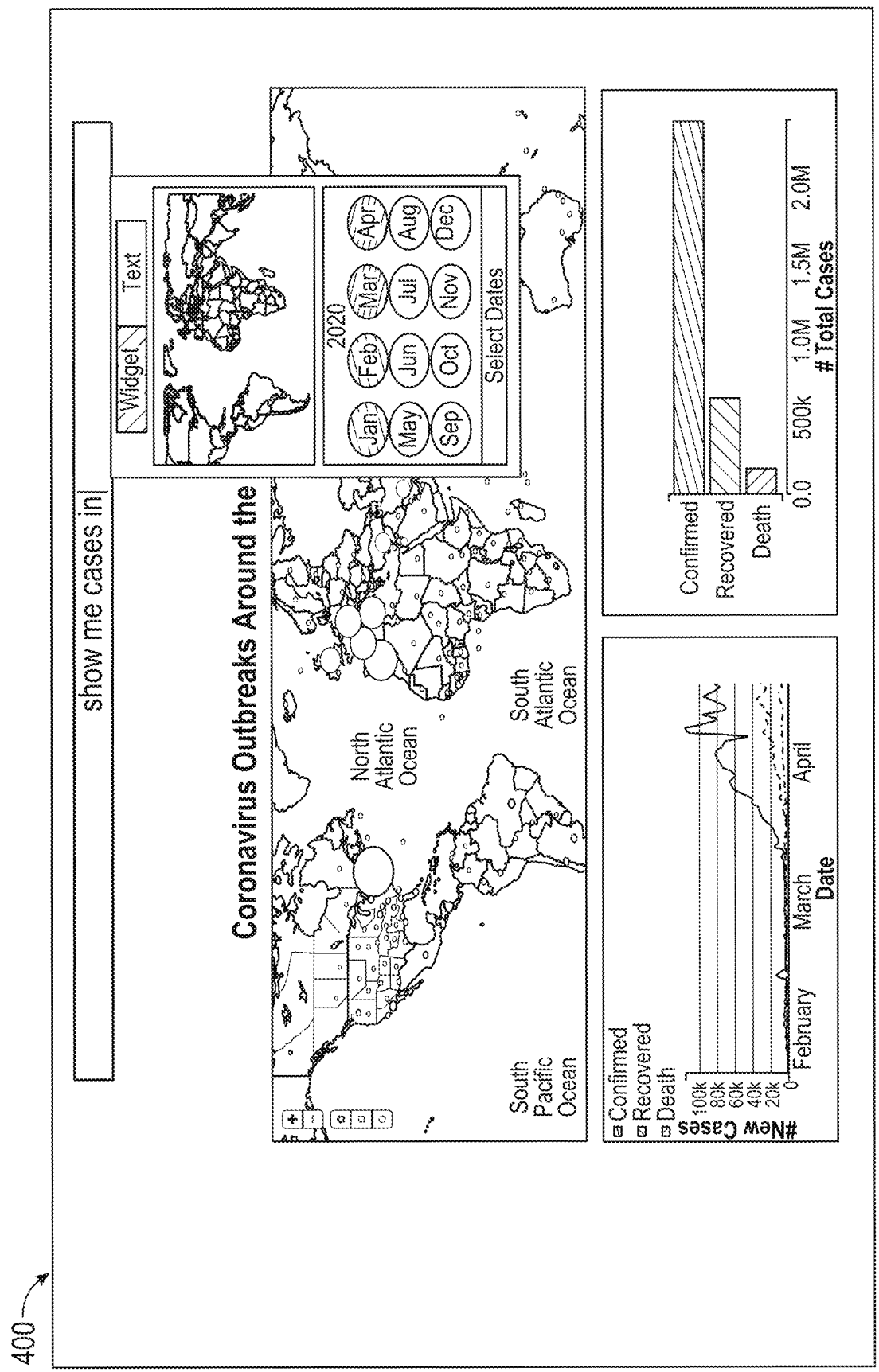
FIG. 4 shows example user interface that supports visual auto-completion for providing a user data previews during their analytical workflows, in accordance with some implementations.

FIG. 4 shows an example user interface 400 that supports visual auto-completion for providing data previews during analytical workflows, in accordance with some implementations.

Figure 5:
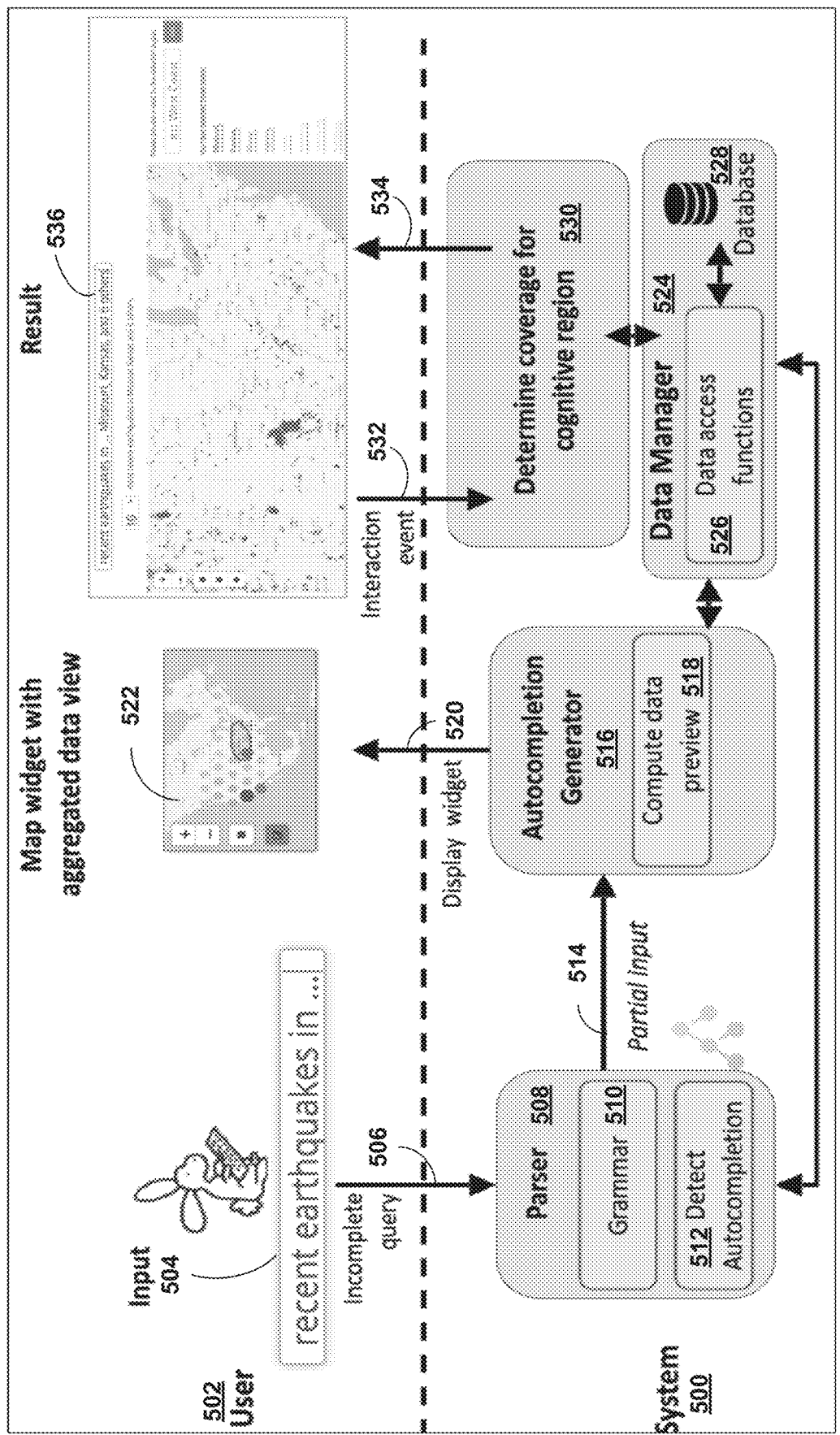
FIG. 5 shows a schematic diagram of an example system according to some implementations.

FIG. 5 is a schematic diagram of an example system 500 according to some implementations. The system implements a lookahead parser to parse a query. The autocompletion detection module holds the query as the user is typing and triggers an autocompletion event when the query is incomplete. With the help of a data manager, an aggregated data preview is generated using the data frequency information. The autocompletion map widget is displayed in the interface. A user can interact with the widget and specify a fuzzy region of interest. The interface is then updated to show the result and the states that fall within this user-selected region.

In some implementations, the system 500 is implemented as one or more modules in the memory 206 of the device 200 described above in reference to FIG. 2. According to some implementations, the system 500 employs a web-based client-server architecture. In some implementations, an input query 504 (sometimes called an incomplete natural language command, an incomplete query 506, or a query) that is input by a user 502 is processed by a parser 508 (e.g., an ANTLR parser) using a grammar 510 (e.g., a context-free grammar) containing predefined rules as well as rules dynamically added based on the data values of data fields from the underlying dataset. In some implementations, the parser 508 accesses the underlying dataset (e.g., data from the database 528) through a data manager 524, which has access functions 526 to handle data requests. In some implementations, an autocompletion detection module 512 polls the query 506 as the user is typing and triggers (514) partial input 514 (e.g., grammar parse tree errors when the query is partially complete). In some implementations, the partial input 514 are passed to an autocompletion generator 516, which introspects on the syntactic structure of the partial query along with the relevant grammar rules that would be satisfied if the query were complete. The generator 516 computes (518) data previews, with the help of the data manager 524, to display (520) widgets (e.g., a map widget 522 with an aggregated data view) to resolve the partial query into a complete one. With the help of the data manager 524, in some implementations, the generator 516 computes (518) necessary data preview information that would be displayed (520) in the autocompletion suggestion. In some implementations, the autocompletion suggestion is then rendered and displayed (e.g., visualization 536) in the user interface of the client. Any interaction that the user performs with these autocompletion suggestions is captured (532) and processed for determining (530) coverage for cognitive region, with the help of the data manager 524. In some implementations, the system updates (534) the visualization result 536, based on the determined coverage for cognitive region.

In some implementations, the system 500 employs a left-to-right LL(*) parser, performing a leftmost derivation of the input search query. An LL(*) parser is used for generating autocompletion suggestions as this class of parsers can gracefully throttle up from conventional fixed $k \geq 1$ token look-ahead to arbitrary look-ahead and is able to backtrack if a suitable parse path cannot be constructed. In some implementations, the input to the parser 508 is a grammar augmented with predicates having corresponding look-ahead actions to trigger events being sent to a suggestion module. In some implementations, each grammar rule encapsulates an analytical intent, similar to other natural language visual analysis grammar systems. The rules are composed of lexicons that are either static (i.e., predefined in the grammar) or dynamic (i.e., computed from the data values of data fields in the database in real-time). In linguistics, a lexicon is a vocabulary of words and phrases that have known semantic meaning. In some implementations, the parser 508 converts the input grammar to an equivalent augmented transition network (ATN), an efficient graph representation for grammars used in parsing relatively complex natural language queries. In some implementations, the state model is computed using a flow analysis that traces the ATN graph representation through all nodes reachable from the top-level node. Given a grammar $G=(N, T, P, S, \Pi, \mu)$, the ATN state machine, $A_G=(Q, \Sigma, \Lambda, E, F)$ has the five elements: (i) Q is the set of states, (ii) $\Sigma$ is the set of tokens $N \cup T \cup \Pi \cup \mu$, (iii) $\Lambda$ is the transition relation mapping $Q \times (\Sigma \cup \varepsilon) \rightarrow Q$, (iv) $E=p_A$, where $A \in N$ is the set of entry states, and (v) $F=p'_A$, where $A \in N$ is the set of final states.

$A_G$ is computed for each nonterminal lexical element from the grammar, creating a state model for each $\Sigma$, according to some implementations. The nonterminal symbols form the syntactic structure of the parse and are replaced by terminal symbols, i.e., the leaf nodes in the parse tree. Nonterminal edges p−+p' are function calls based on $\Lambda$ that push the return state p' onto a parse state stack so it can continue from p' after reaching the stop state for the state flow. In some implementations, the parser simulates actions in the ATN to predict the next tokens in Q and computes a look-ahead parse tree. Prediction errors occur in the ATN when a sequence does not resolve to a corresponding grammar production rule for the current nonterminal. The LL(*) prediction state model reports an error at the specific token and scans ahead to determine if there are any nonterminals that can resolve the error. For autocompletion to trigger, the shortest look-ahead sequences are identified that would generate valid parse trees, according to some implementations. In some implementations, the autocompletion detection algorithm is generalized for both static and dynamic lexicons.

Figure 6A:
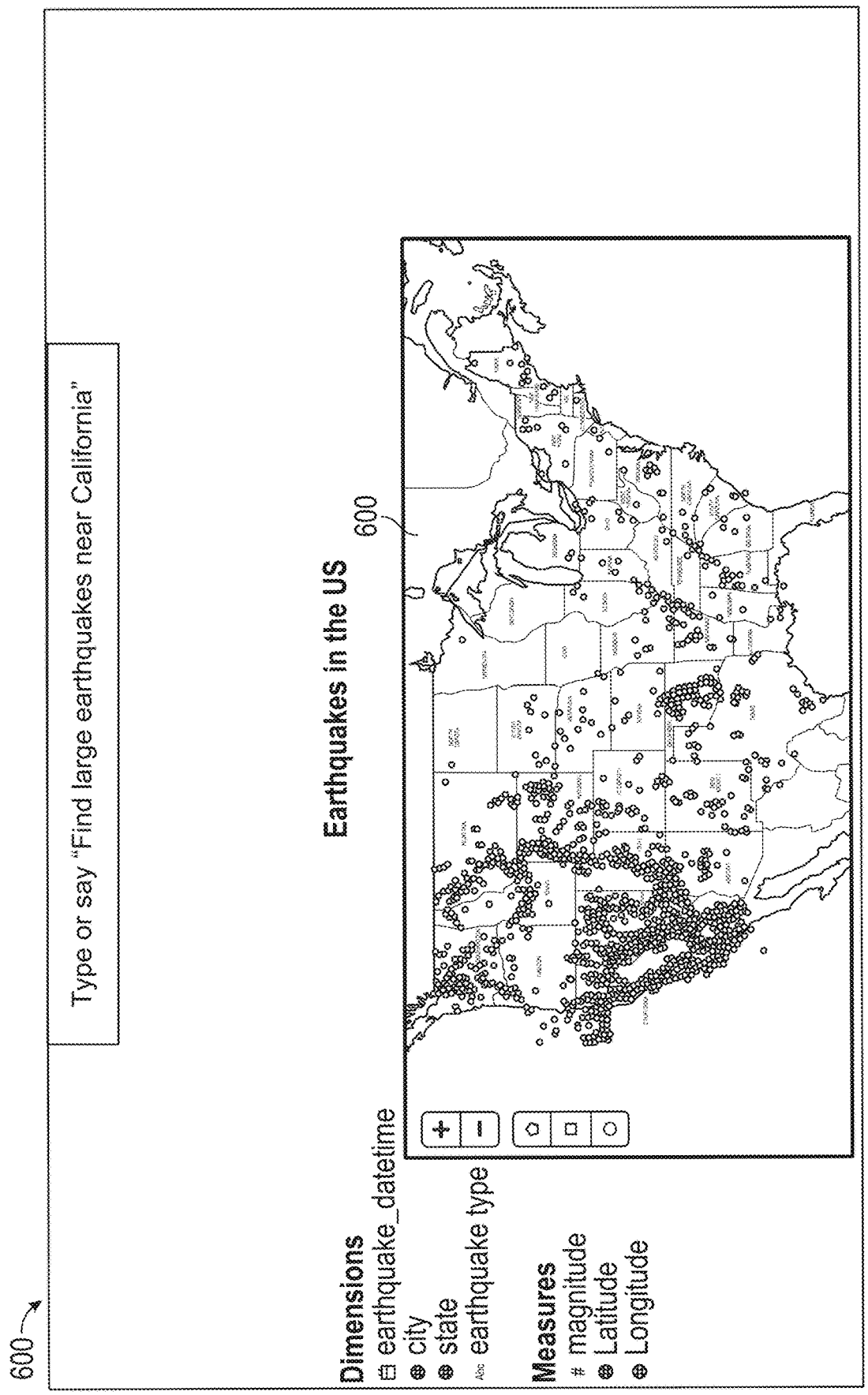
FIGS. 6A-6G, 7A-7C, 8A, 8B, 9A-9C, 10, and 11 show an example interface, according to some implementations.
Figure 6B:
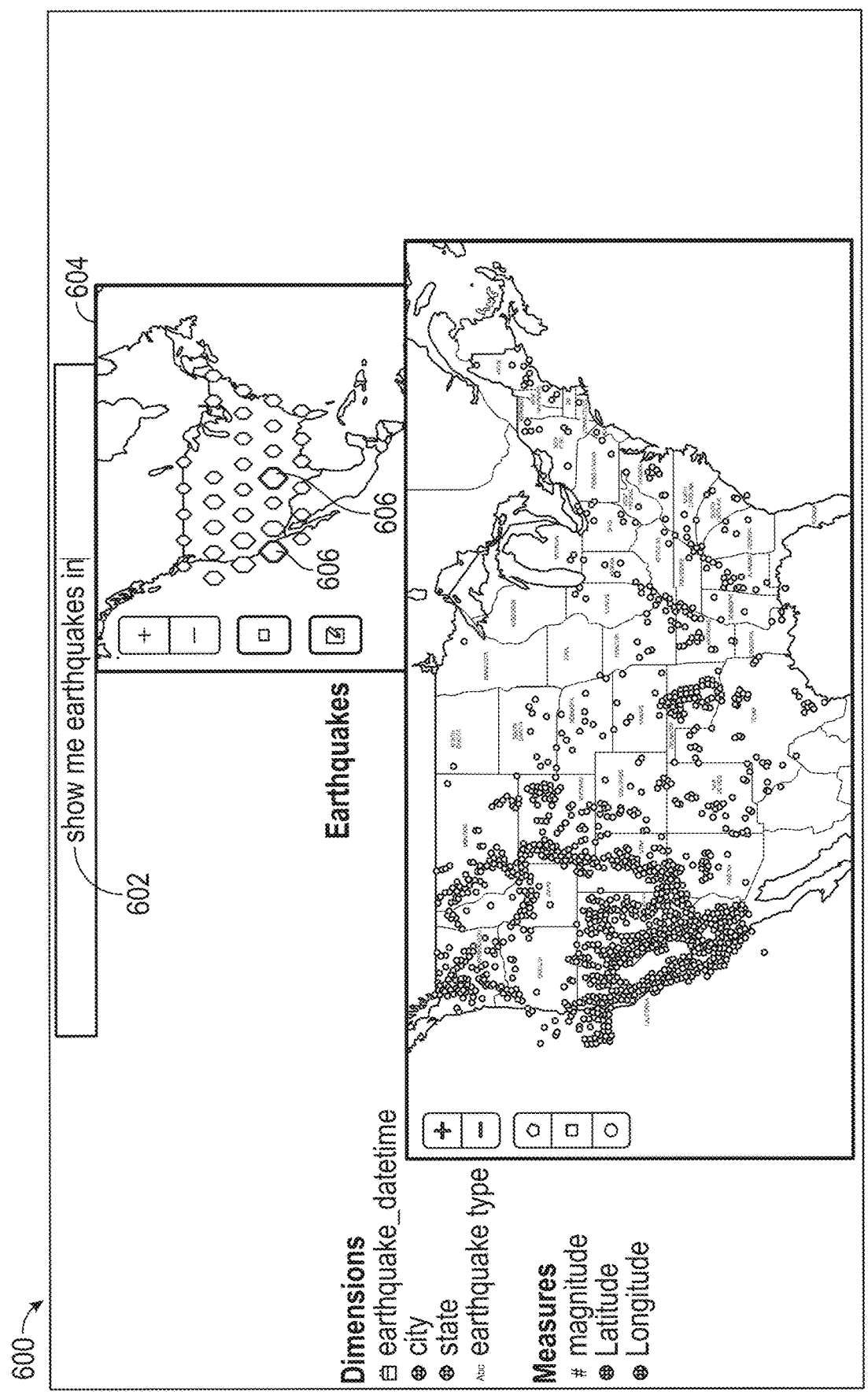
Figure 6C:
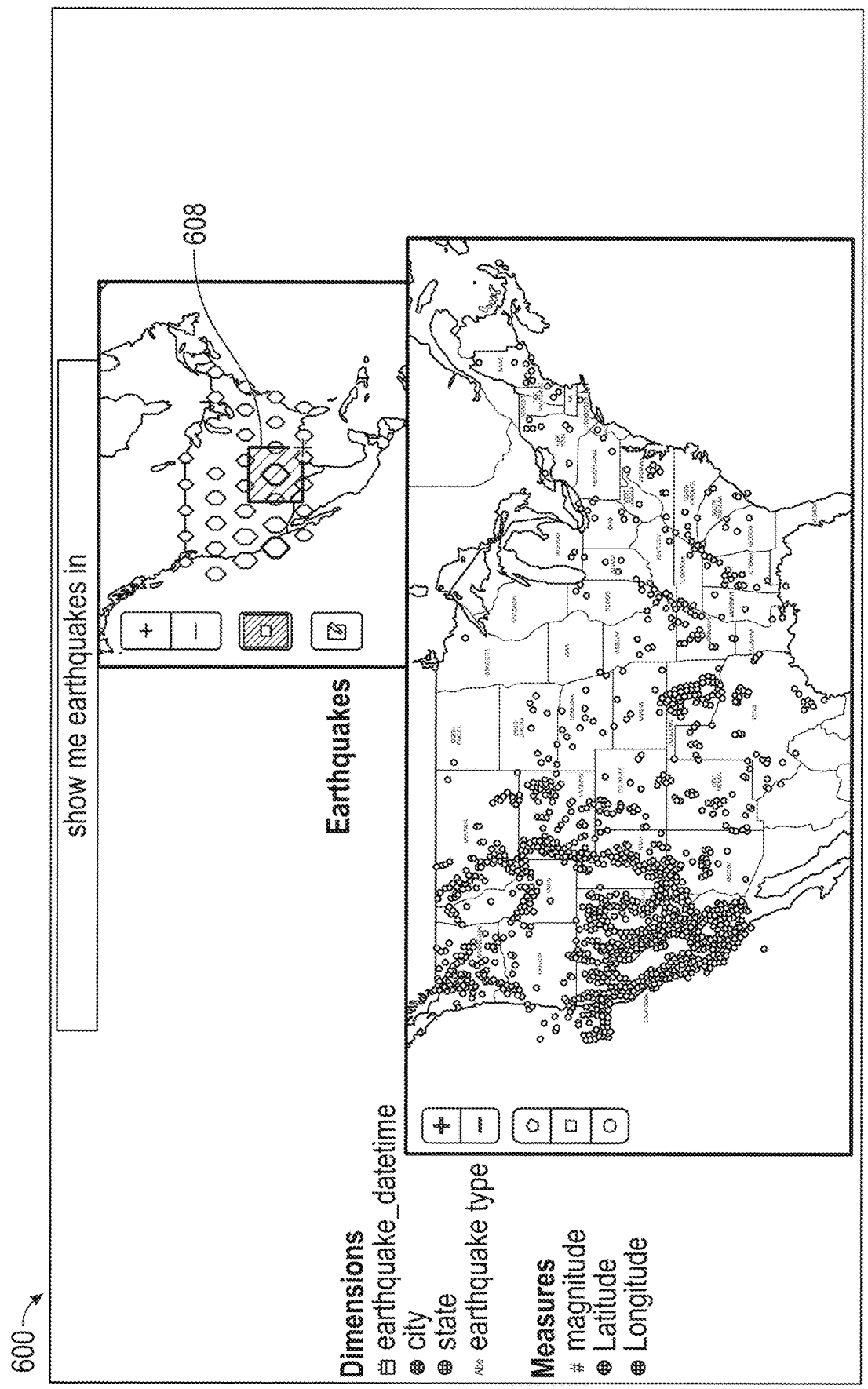
Figure 6D:
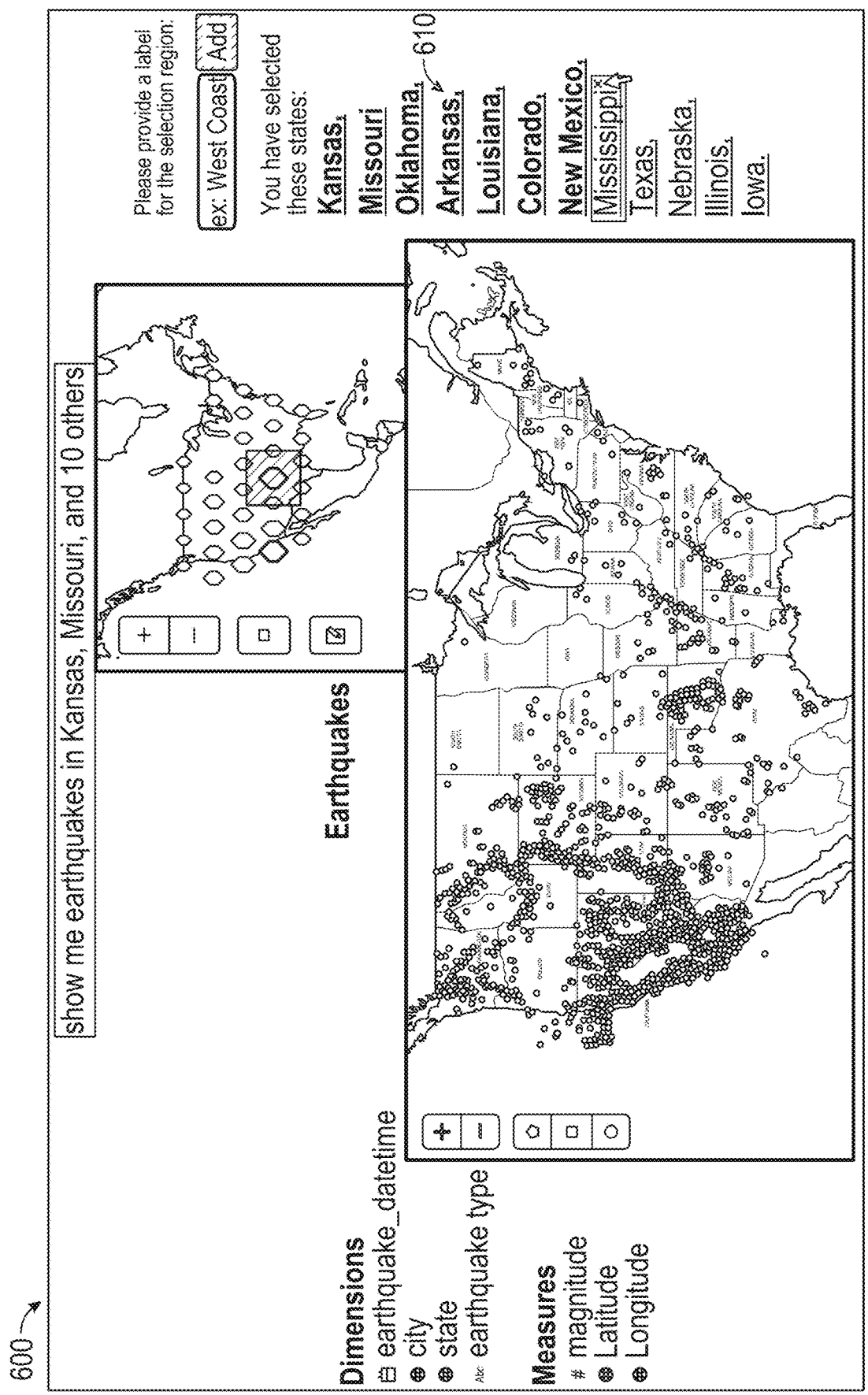
Figure 6E:
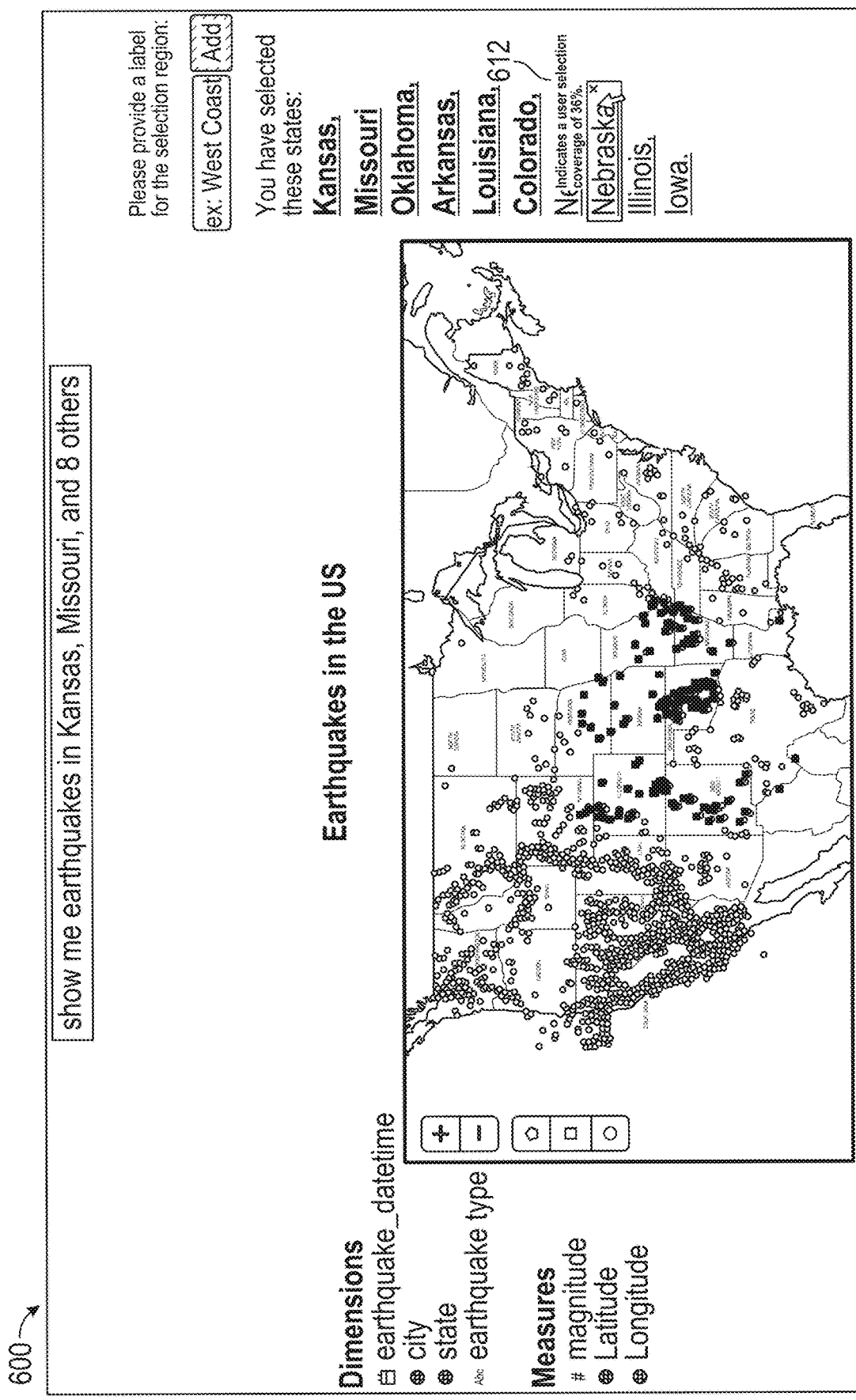
Figure 6F:
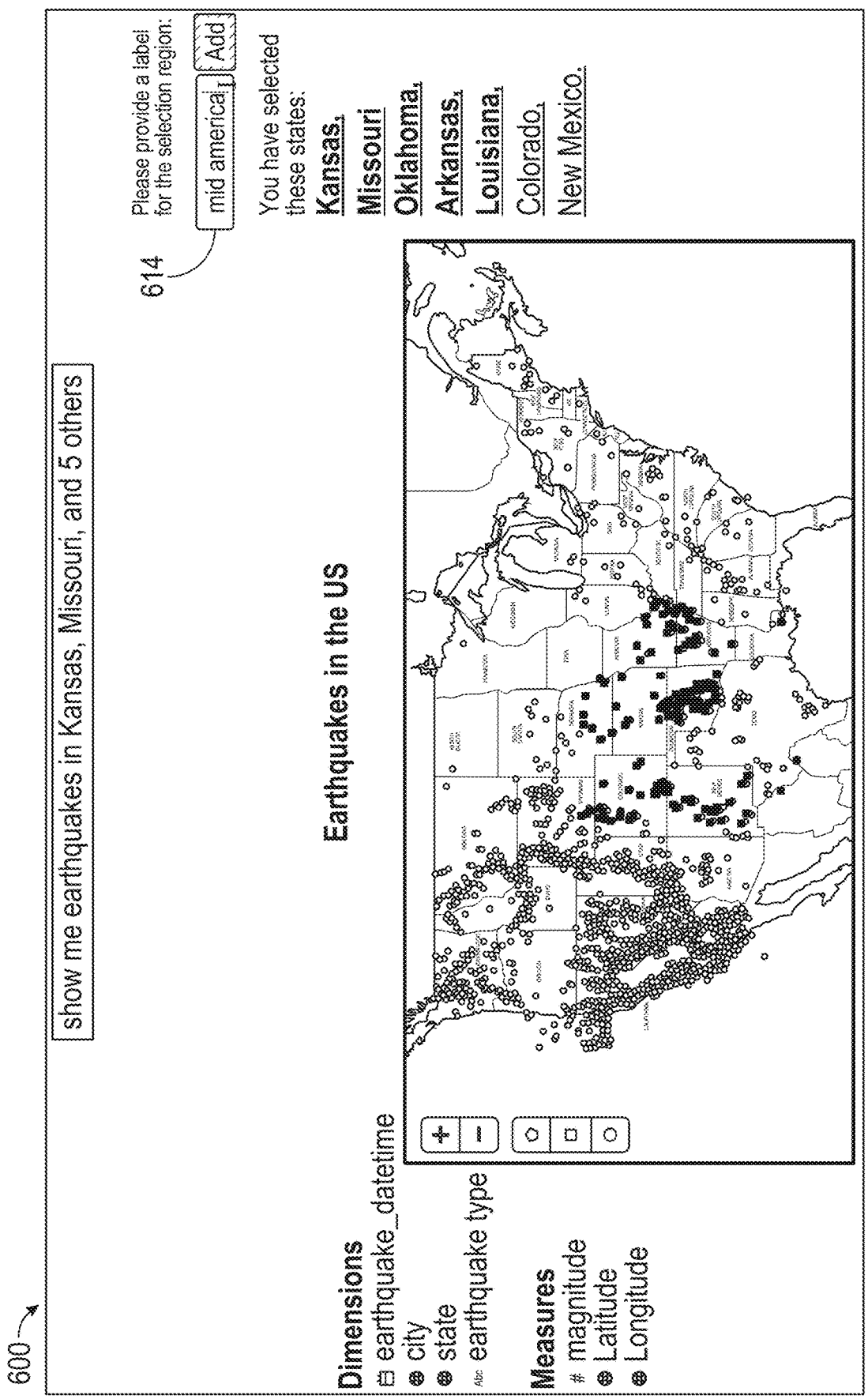
Figure 6G:
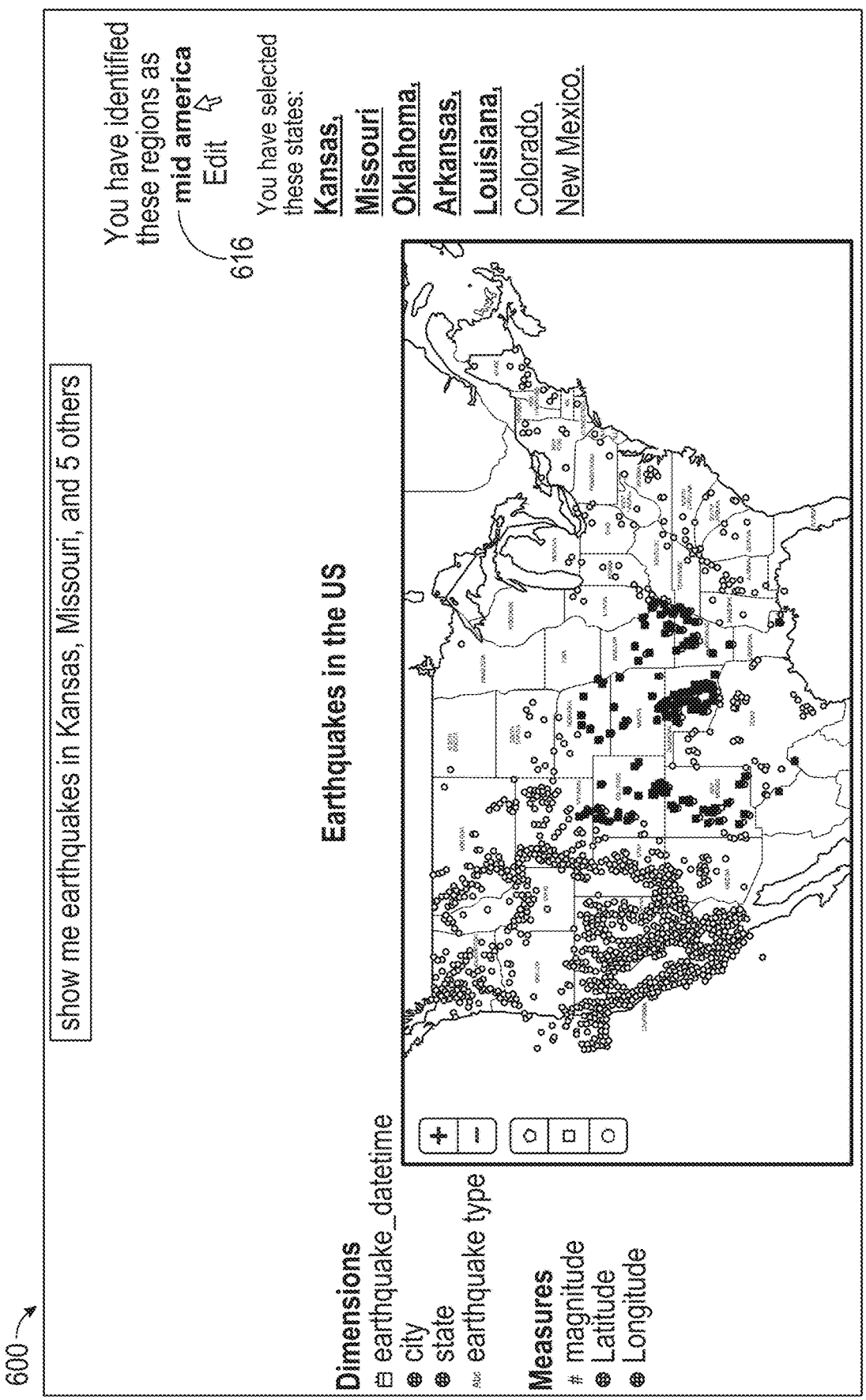

FIG. 6A shows an example user interface 600 that shows a map 602 of earthquakes in the United States, according to some implementations. In FIG. 6B, a user starts by typing "show me earthquakes in" 602. In response, a map widget 604 appears to auto-complete the partial query. Hexagonal spatial bins 606 inside the map widget 604 show the aggregated data distribution. In FIG. 6C, the user then proceeds to select an area of interest through a rectangular selection 608. In FIG. 6D, after the user has completed the selection, the system presents a summary 610 of the regions included on the right. In FIG. 6E, the summary shows information 612 as to how much of the region was contained in the rectangular selection. In FIG. 6F, the user removes some of the states from the selected region (relative to FIG. 6E) and names the selection "mid America" 614. In FIG. 6G, this named cognitive region is stored 616 for future reference in the user's session.

Figure 7A:
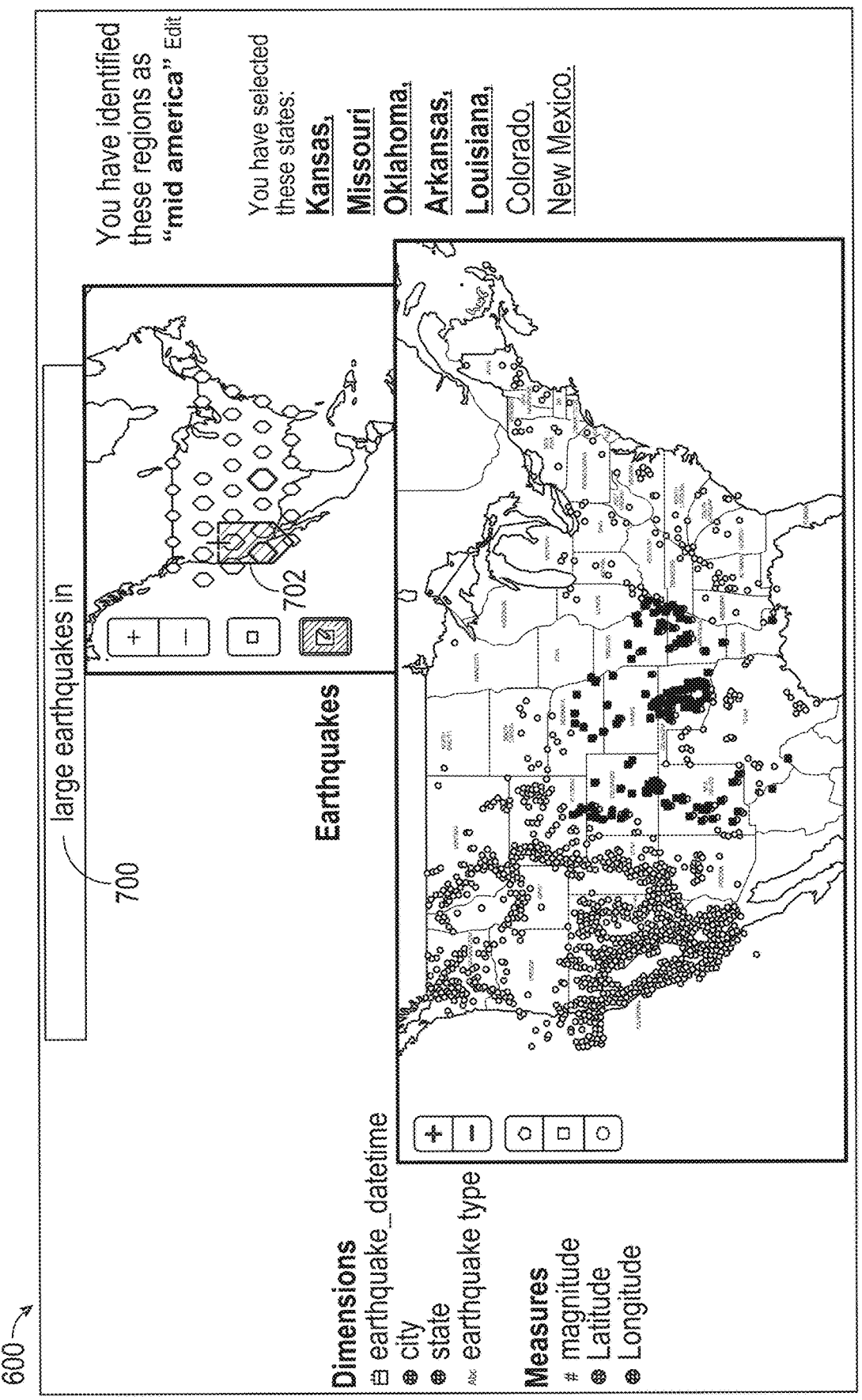
Figure 7B:
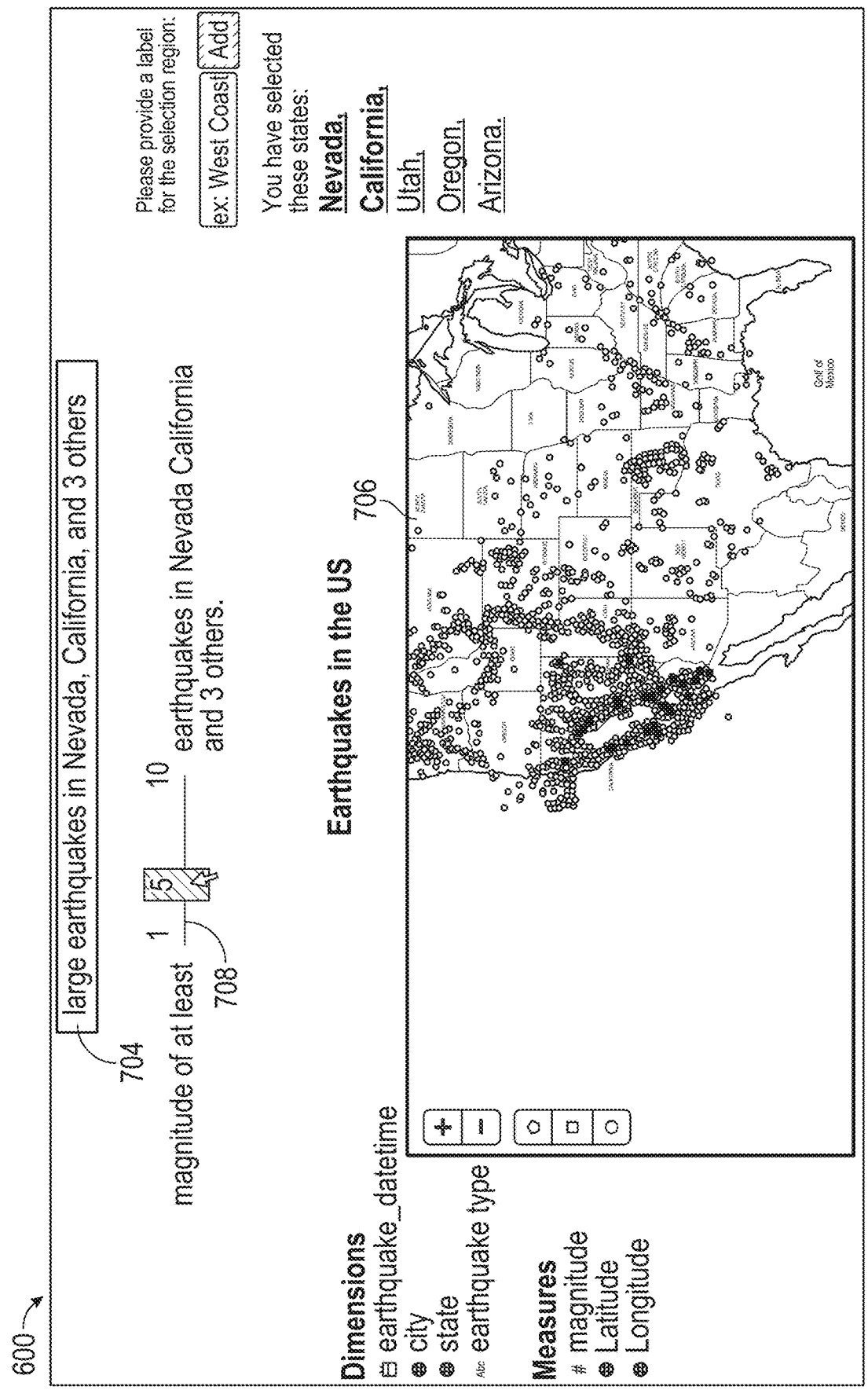
Figure 7C:
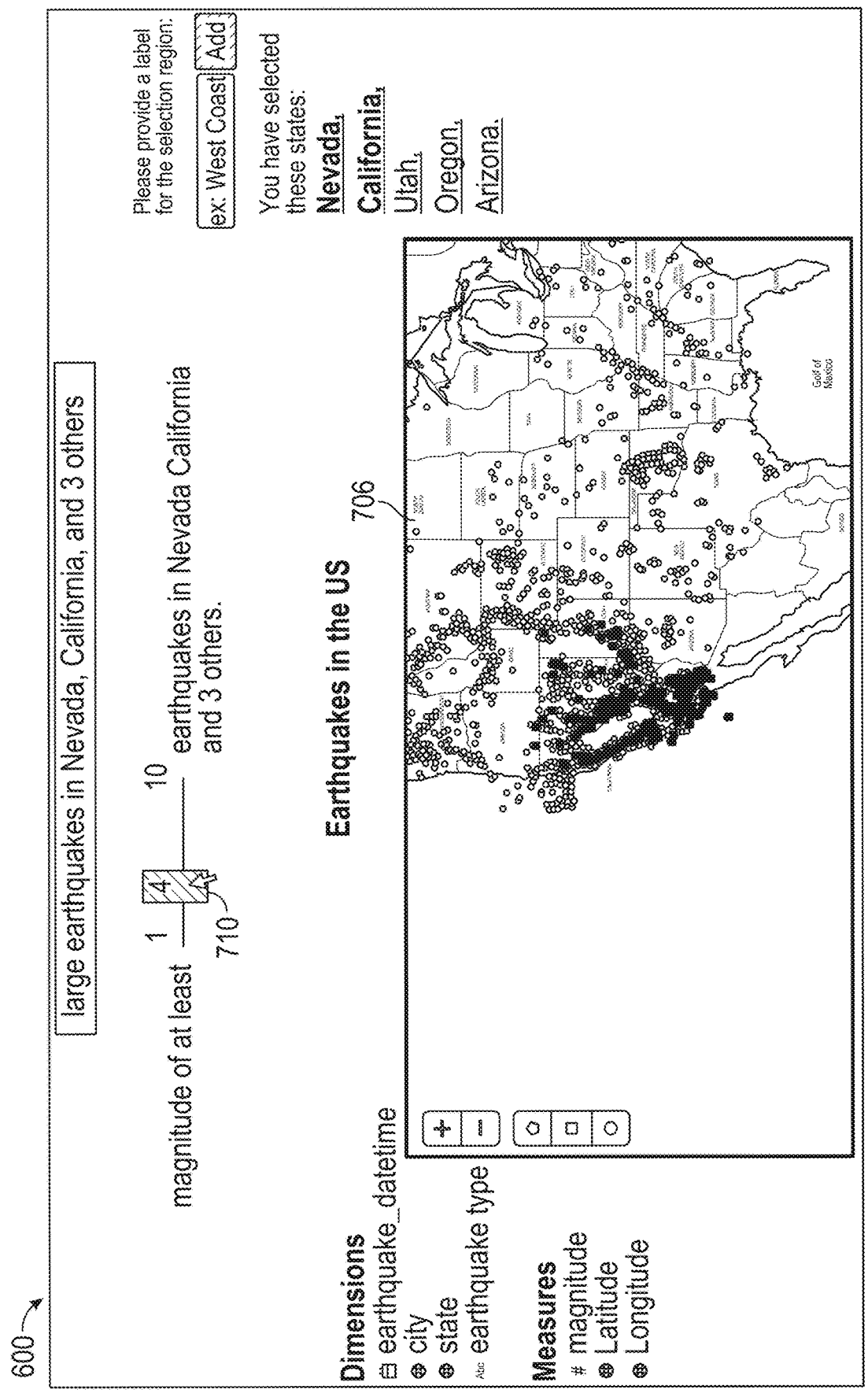

In FIG. 7A, the user types "large earthquakes in" 700 and uses a free-draw selection to select a region of points 702 on the west coast and hits enter. In FIG. 7B, the system shows earthquakes in that region (as indicated by text 704 and map 706), and displays a slider 708 for large earthquakes (an initial selection of magnitude 5 is also shown). In FIG. 7C, the user adjusts the slider to select magnitude 4 and higher 710, and the points on the map 706 are adjusted accordingly.

Figure 8A:
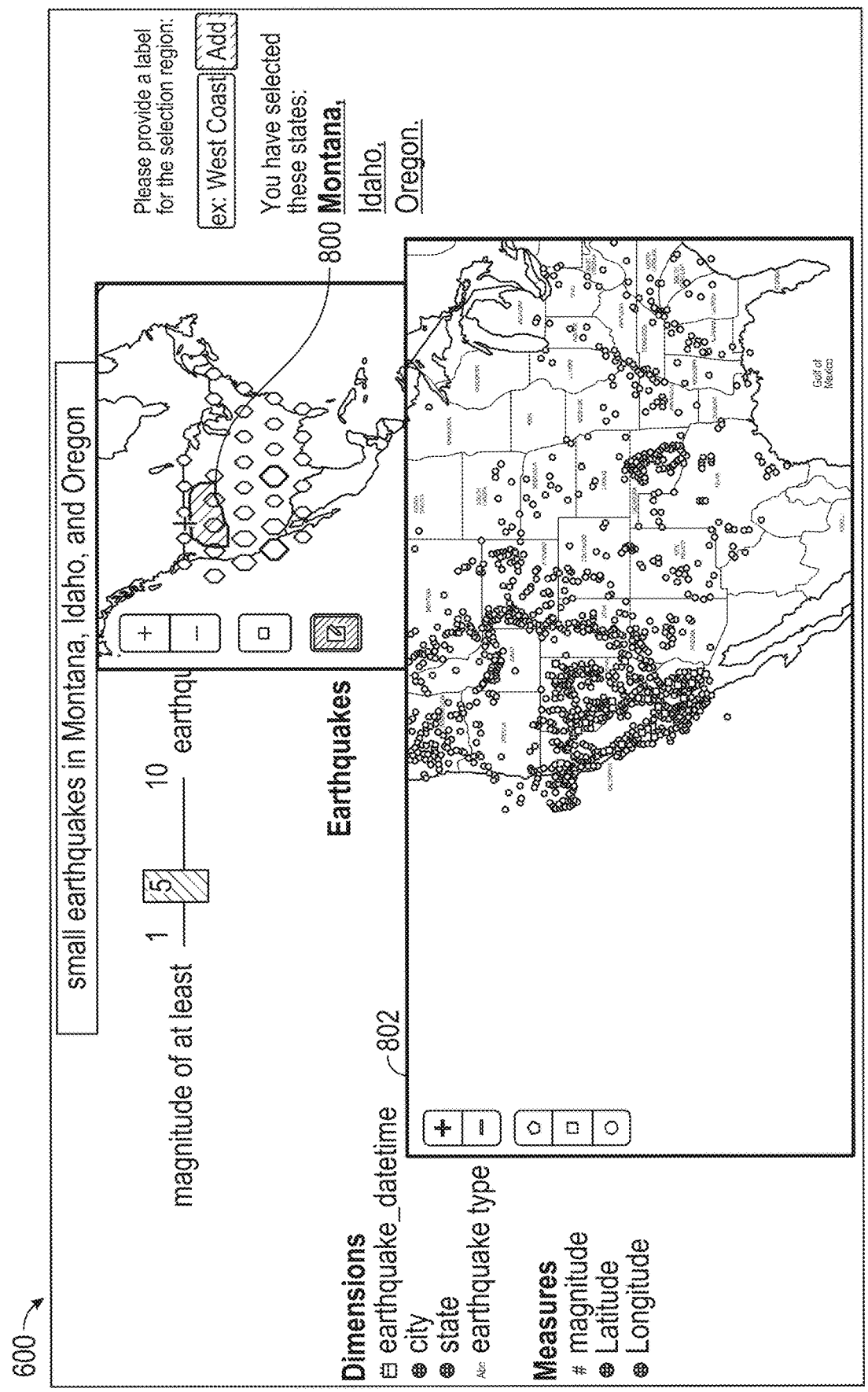
Figure 8B:
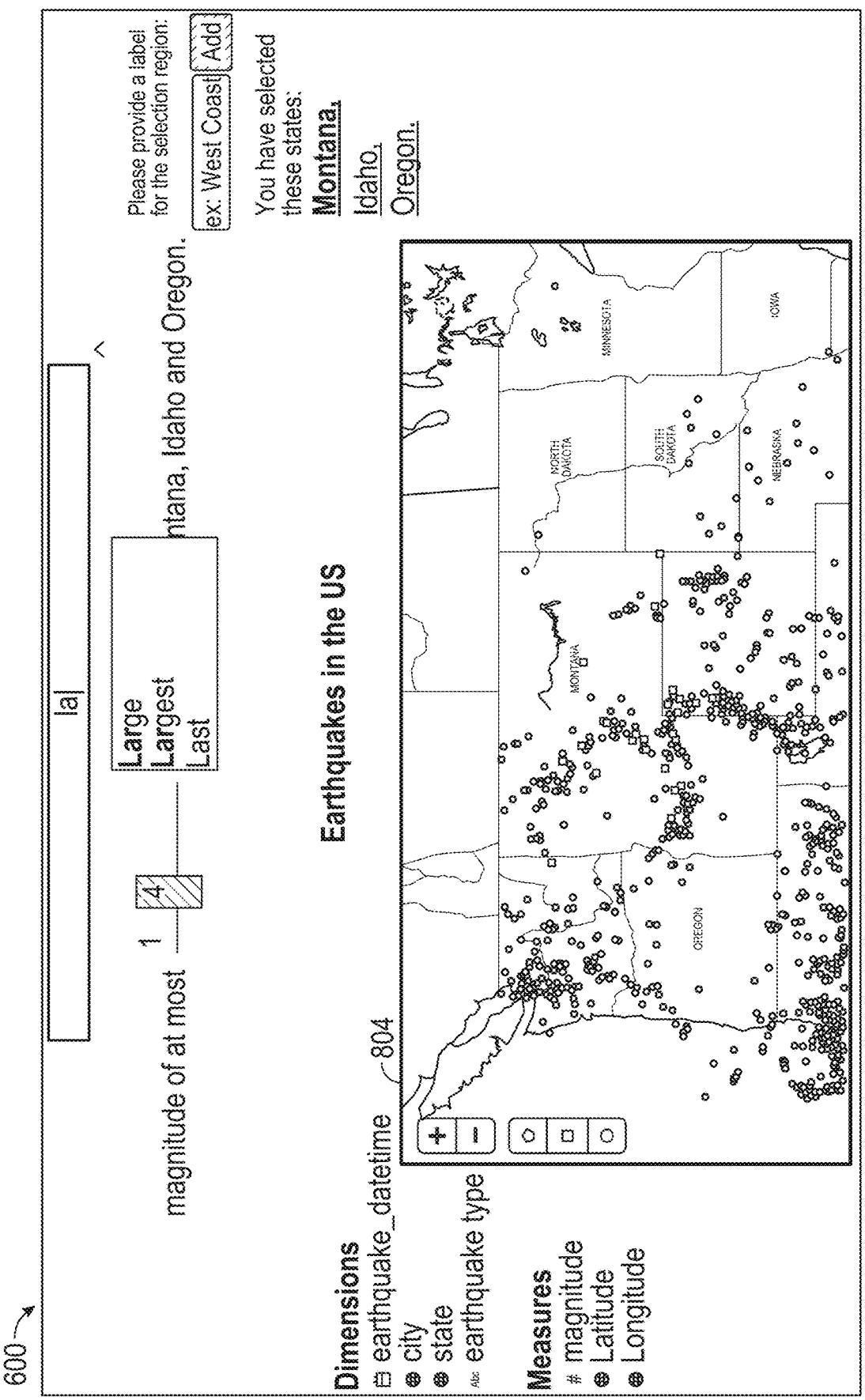

In FIG. 8A, the user subsequently explores "small earthquakes in a region selected in the upper northwest" (by a free draw selection 800). The system updates map 802 accordingly (compare the map 802 and updated map 804), as shown in FIG. 8B, according to some implementations.

Figure 9A:
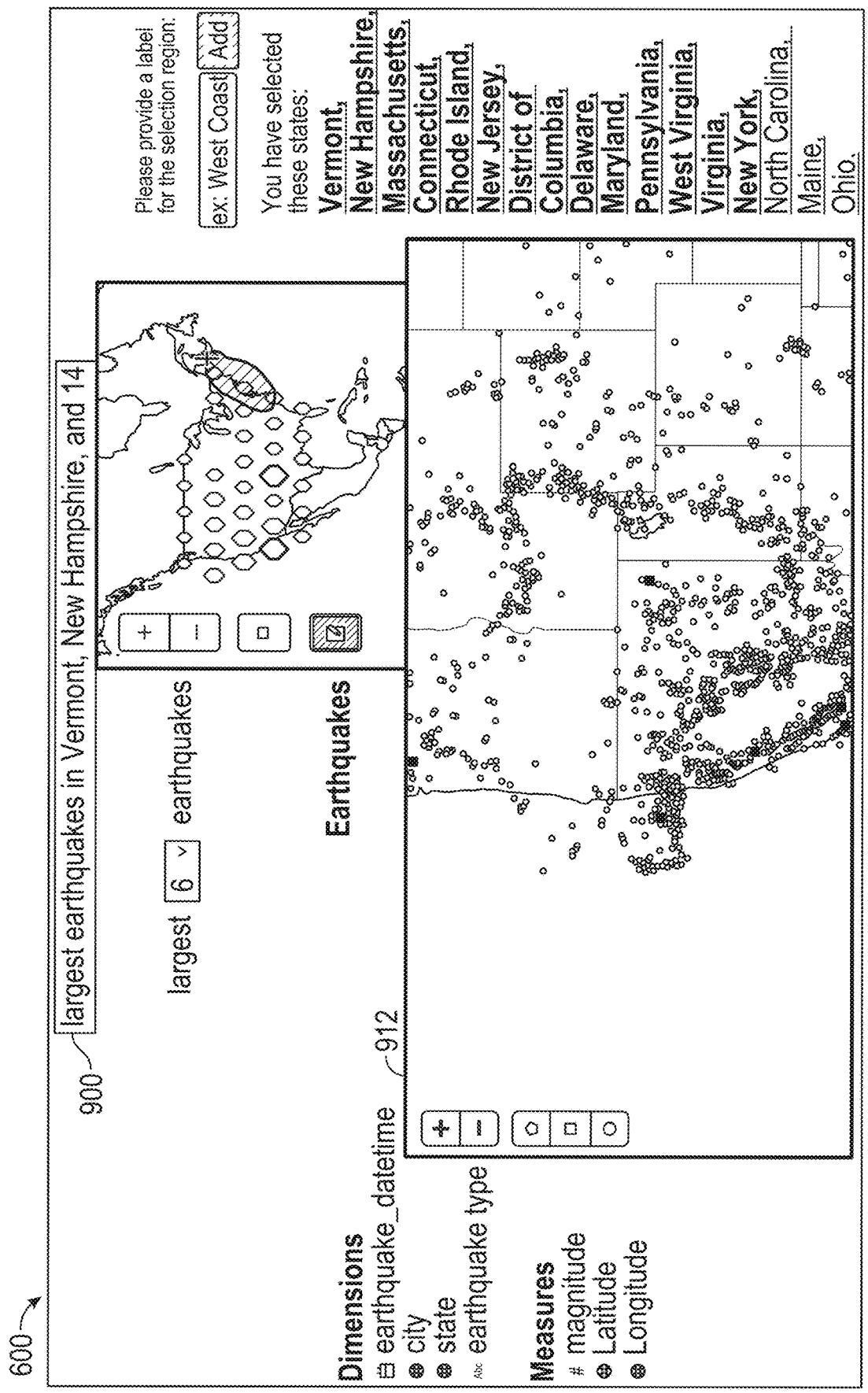
Figure 9B:
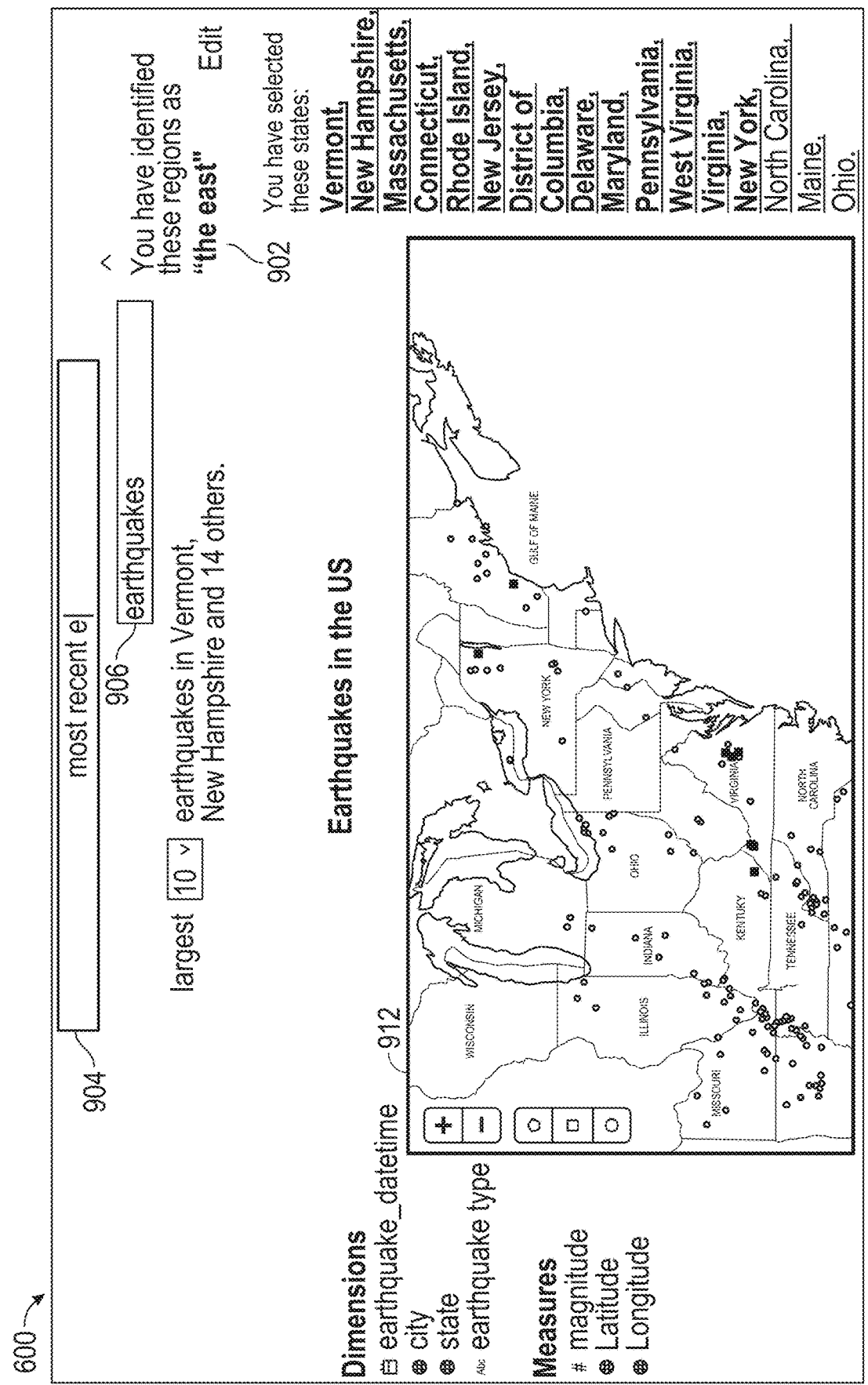
Figure 9C:
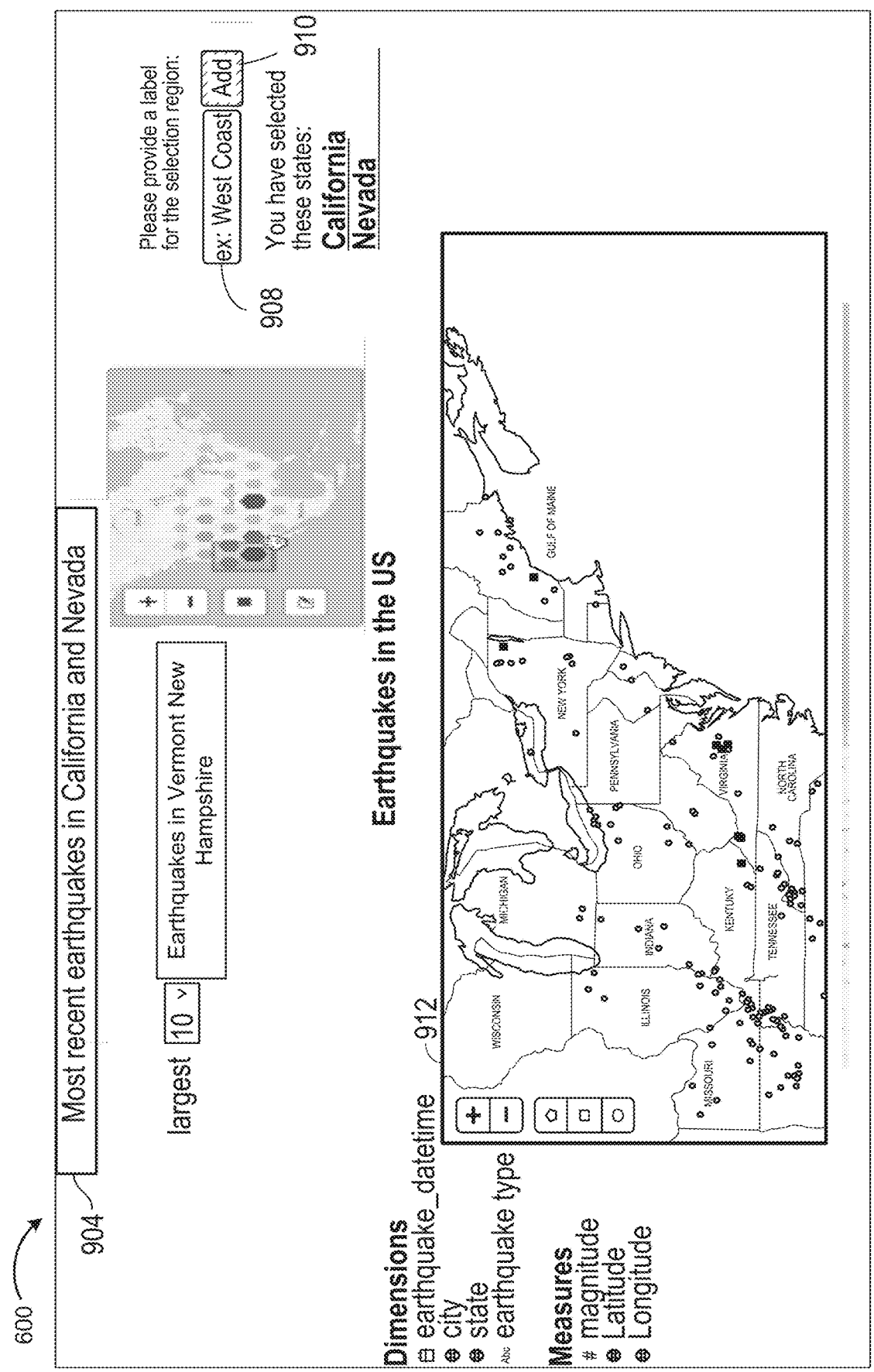

In FIG. 9A, the user then proceeds to explore "largest earthquakes" in the eastern parts of the United States (as indicated by user input 900). In FIG. 9B, the user names the region "the east" 902 and starts typing "most recent e" 904 and the system shows an option to select "earthquakes" 906 based on the state of the map and the user selection. In FIG. 9C, the user names the region "west coast" 908 and chooses to store the region (e.g., by clicking an affordance 910) so that the named region can be used again later.

Figure 10:
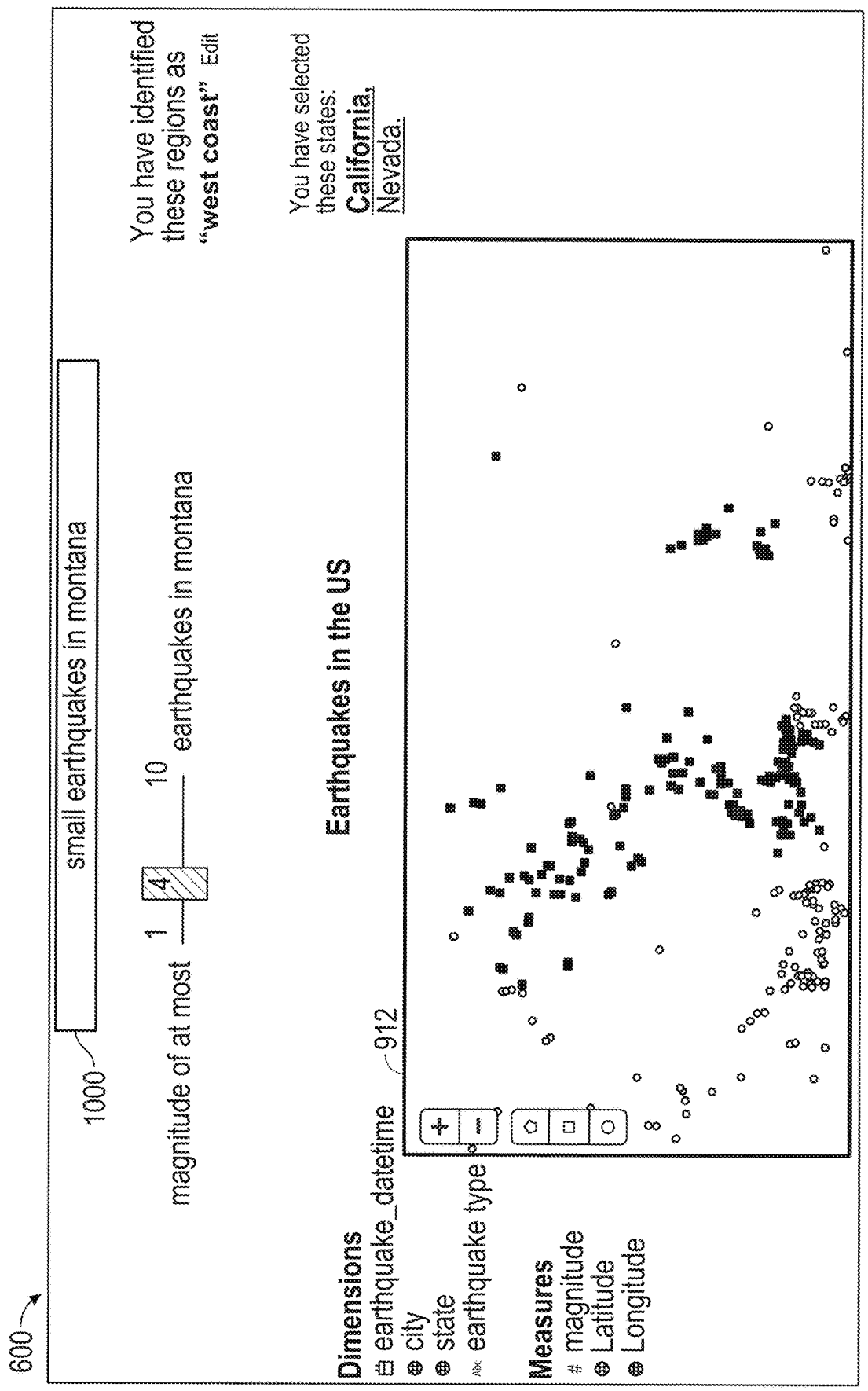

In FIG. 10, the user selects to view data for a specific region (e.g., "small earthquakes in montana" 1000), and the system updates map 912, according to some implementations.

Figure 11:
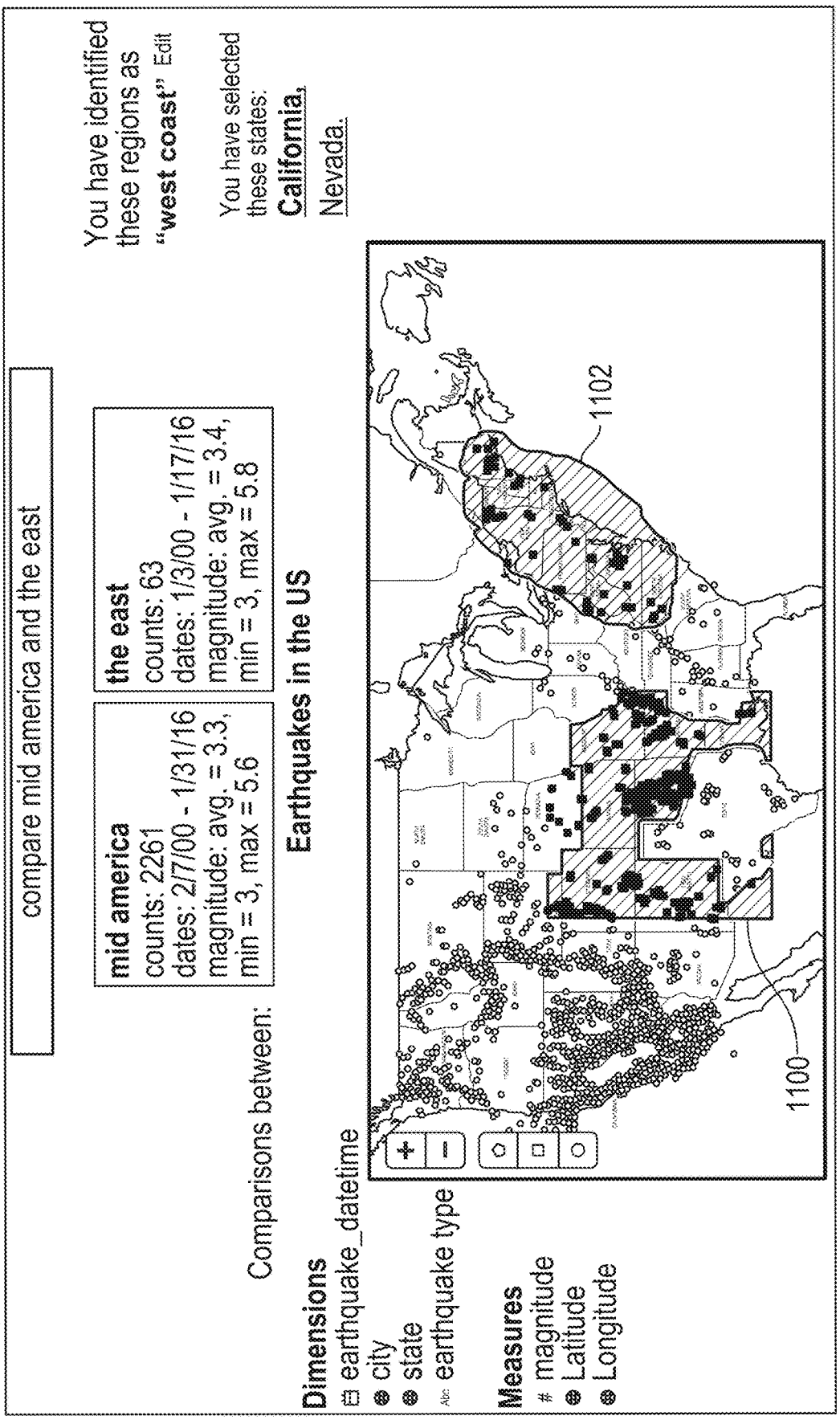

As shown in FIG. 11, the user may also compare two cognitive regions that the user previously stored (e.g., "compare mid America and the east", regions 1100 and 1102), according to some implementations.

Example Experimental Results

A user study was conducted to evaluate the system according to the techniques described above. The study had the following goals: (1) collect qualitative feedback on how people express and query for cognitive regions in visual analysis and (2) identify system limitations and opportunities for how the semantics of place can be used to further data exploration. The study explored the ways people explored data and how they responded to the system behavior. Because a goal of the study was to gain qualitative insight in the system behavior, participants were asked to think aloud with the experimenter.

The study recruited 12 volunteers (five males, seven females, age 36-65) from a local town mailing list. The participants had a variety of backgrounds—user researcher, sales consultant, engineering leader, product manager, investor, commercial real estate broker, program manager, and marketing manager. Based on self-reporting by the participants, all were fluent in English and regularly used some type of NL search interface, such as Google. Seven participants regularly used a visualization tool and the rest had limited proficiency.

The evaluation used a dataset of approximately 10,000 earthquakes in the US, with a standardized structure and attributes. While earthquakes were used the evaluation, the system will work with any point dataset. The study began with a short introduction of how to use the system. Participants were instructed to phrase their queries in whatever way that felt most natural and to tell whenever the system did something unexpected. Although the example system could handle other analytical queries, participants were asked to specifically focus on geospatial ones, to better understand how they would explore the data based on place. Reactions to system behavior were discussed with participants throughout the session and concluded with an interview. Each session took approximately 30 minutes. A mixed-methods approach involving qualitative and quantitative analysis was used for analysis. The quantitative analysis was used as a complement to the qualitative findings.

Overall, participants were positive about the system and identified many benefits. Given that the US earthquakes dataset was used for the study, most questions were centered around the intensity and recency of earthquakes occurring in various geographic areas. Several participants were impressed with the system's ability to understand their fuzzy geospatial queries. The participants appreciated the functionality for specifying and saving cognitive regions in their analysis. The total number of queries that participants typed ranged from 8 to 20 ($\mu$=10.4). The number of times the map widget was used to select a geographical region ranged from 5 to 11 ($\mu$=7.4). Most of the times when participants interacted with the map widget, they named and saved a cognitive region; the number of times ranged from 6 to 8 ($\mu$=6.8). Participants reused these saved cognitive regions 4 to 8 ($\mu$=5.9) times in subsequent analytical questions in their user sessions. The most common cognitive regions that participants named were 'the west' (47%), 'northwest' (38%), 'south' (12%), and 'midwest' (3%). The most common analytical queries were related to 'large' (42% of the interactions), 'small' (31%), and 'compare' (25%) earthquakes, with the remaining for 'recent.' All participants interacted with the sliders and drop-down menus in the text response to understand the system behavior.

Some implementations provide control over the spatial resolution. For example, the hexbins (regions of a map represented as hexagons) in the map widget adjust based on map zoom for providing some user control over spatial resolution. Some implementations provide control over the spatial resolution of the hexagons in the map widget used to discretize the data. Some implementations provide more data-driven control, matching the scale of a user's analysis to the scale of the data, or perhaps, including other spatial aggregation options, such as heatmaps.

Some implementations provide comparisons between cognitive region features. For example, some systems support quantitative comparisons between cognitive regions by providing statistics, such as mean, average, minimum, and maximum values. However, participants expected richer comparisons between features and the ability to specify which features they were interested in. Many of the analytical tasks involving cognitive regions tend to involve comparisons of complex properties. Some implementations provide support for users with interaction techniques to specify the properties of interest and for visual analysis tools to provide richer summaries of such comparisons.

Some implementations provide recommendations based on cognitive region properties. Visualization recommendation systems are highly data-driven and rely on users' past behavior and preferences. Interfaces that support analytical inquiry with cognitive regions provide a motivating scenario for recommending other cognitive regions that may have similar data characteristics. For example, such recommendations could be useful for developing medicine distribution and treatment logistics in developing countries, enabling users to look at the trend in cases, population, and number of treatment centers. Some implementations recommend new cognitive regions to look into based on what users already focused on.

Example Method for Visual Analysis of a Dataset

FIGS. 12A-12J provide a flowchart of a method 1200 that uses (1202) natural language for visual analysis of a dataset, according to some implementations. The method is performed (1204) at a computing system (e.g., the computing device 200) having one or more processors (e.g., the processors 202) and memory (e.g., the memory 206) storing (1206) one or more programs configured for execution by the one or more processors. The method includes receiving (1208) user selection of a data source (e.g., the data source

240-1). The method also includes presenting (1210) a natural language interface for analysis of data in the selected data source.

The method also includes: in response to receiving (1212) a first user input to specify an incomplete natural language command directed to the data source, presenting (1214) a map widget for selecting geospatial data points from the data source. Referring next to FIG. 12B, in some implementations, the method further includes determining (1218) if the first user input specifies an incomplete natural language command by parsing the first user input to check for grammar parse tree errors. Referring next to FIG. 12C, in some implementations, the method further includes determining (1220) if the first user input specifies an incomplete natural language command by parsing the first user input to identify place-related tokens. Referring next to FIG. 12E, in some implementations, the map widget includes (1224) an aggregated preview of data from the data source. In some implementations, the aggregated preview includes (1226) a hexbin-based preview that displays regions of a map as hexagons. In some implementations, the map widget further includes (1228) a detailed base map for additional spatial context.

Figure 12A:
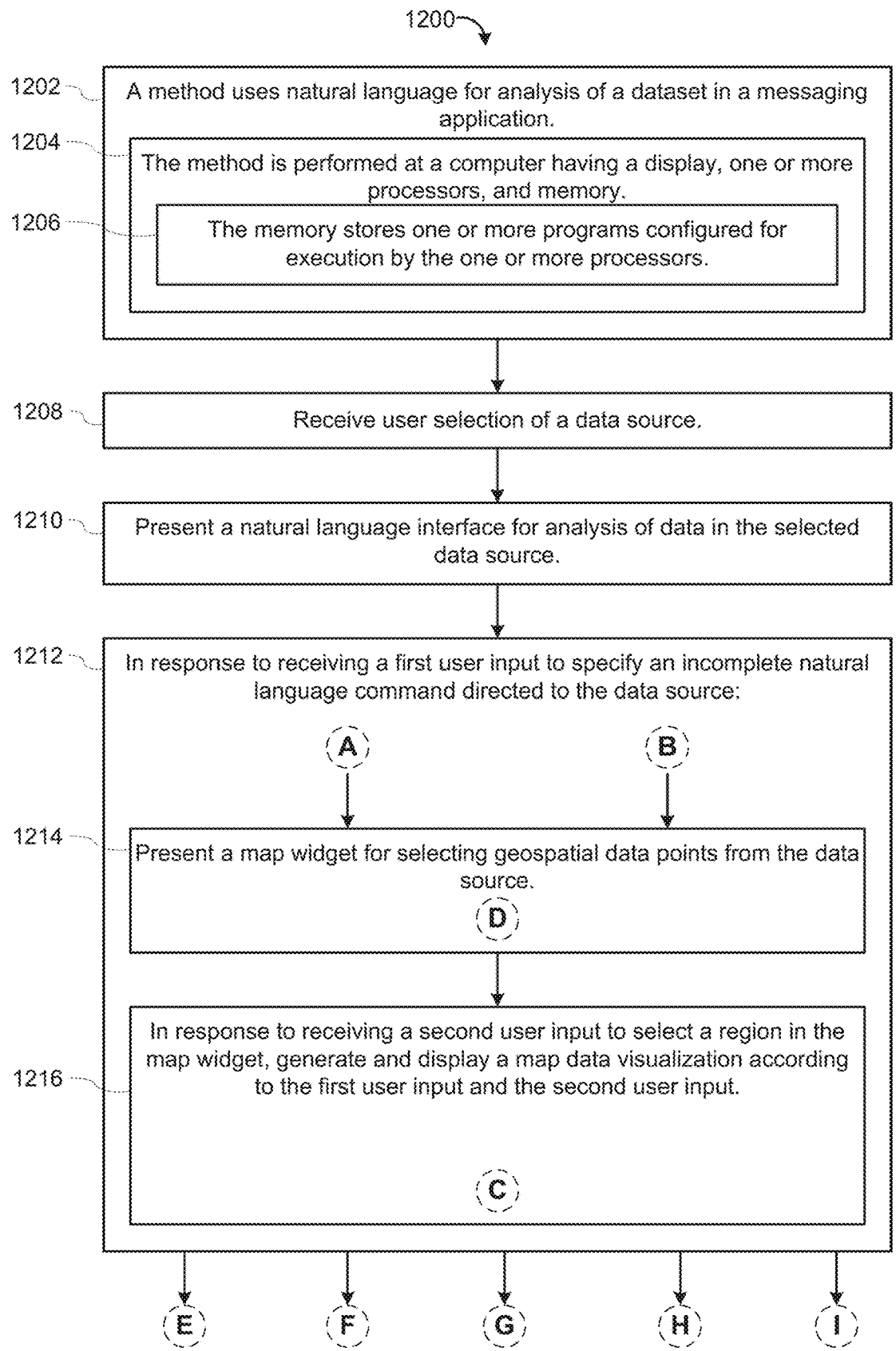

Referring back to FIG. 12A, the method also includes: in response to receiving (1212) the first user input to specify an incomplete natural language command directed to the data source, in response to receiving a second user input to select a region in the map widget, generating and displaying (1216) a map data visualization according to the first user input and the second user input. Referring next to FIG. 12C, in some implementations, the second user input is (1222) either a rectangular or a free draw selection.

Figure 12F:
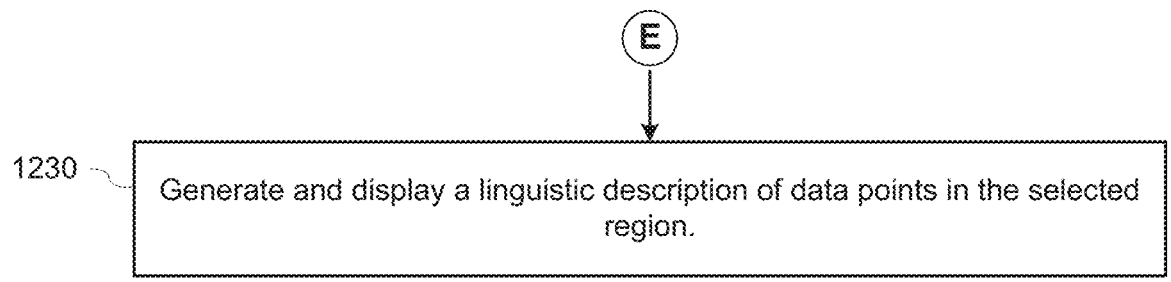

Referring next to FIG. 12F, in some implementations, the method further includes generating and displaying (1230) a linguistic description of data points in the selected region.

Figure 12G:
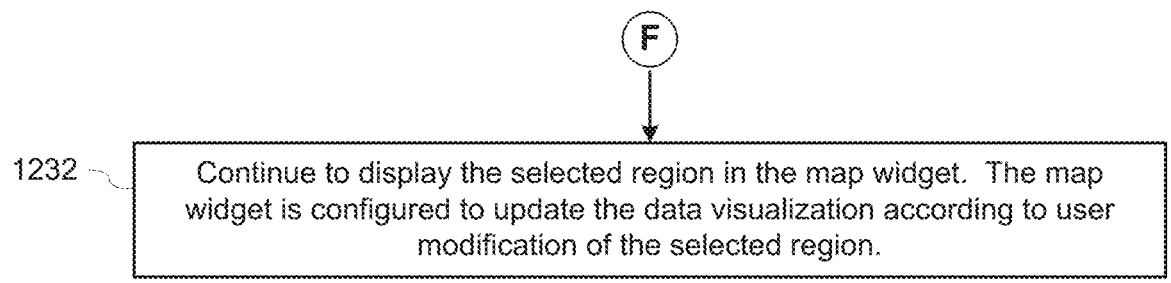

Referring next to FIG. 12G, in some implementations, the method further includes continuing to display (1232) the selected region in the map widget, wherein the map widget is configured to update the data visualization according to user modification of the selected region.

Figure 12H:
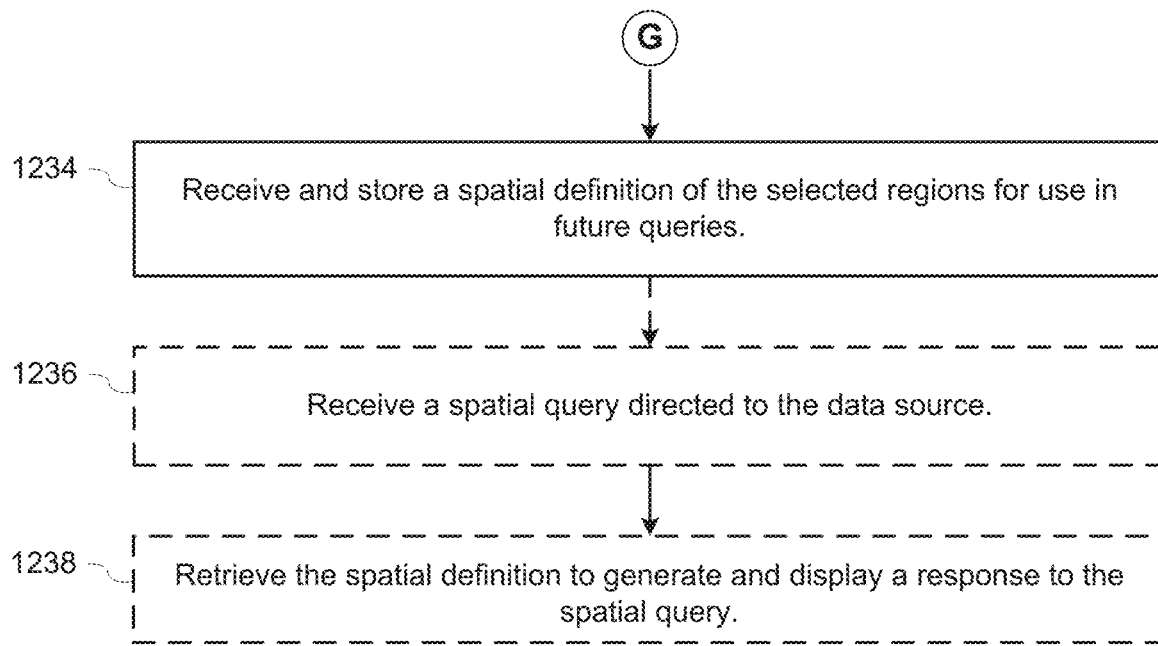

Referring next to FIG. 12H, in some implementations, the method further includes receiving and storing (1234) a spatial definition of the selected regions for use in future queries. In some implementations, the method further includes: receiving (1236) a spatial query directed to the data source; and retrieving (1238) the spatial definition to generate and display a response to the spatial query.

Figure 12I:
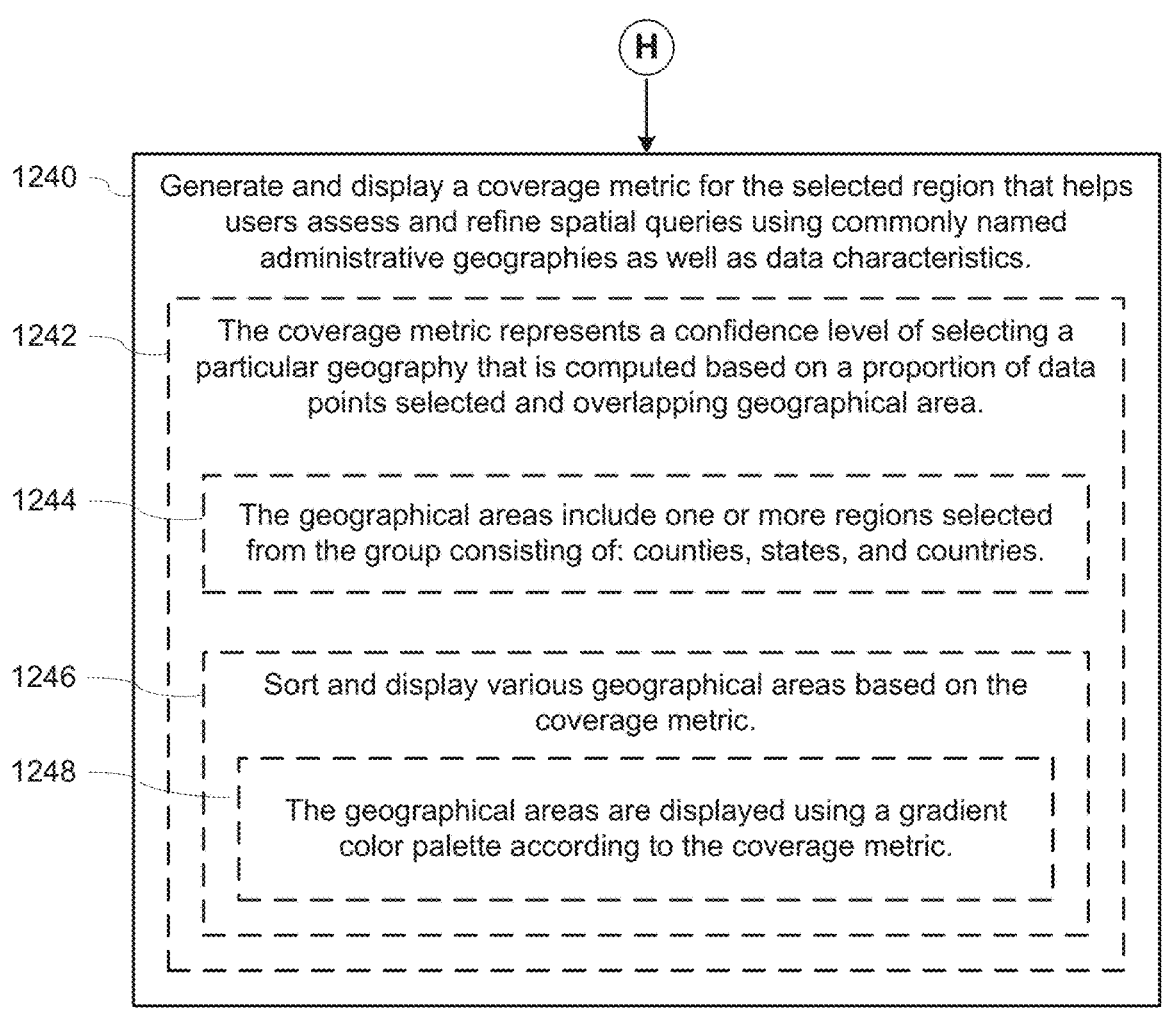

Referring next to FIG. 12I, in some implementations, the method further includes: generating and displaying (1240) a coverage metric for the selected region that helps users assess and refine spatial queries using commonly named administrative geographies as well as data characteristics. In some implementations, the coverage metric represents (1242) a confidence level of selecting a particular geography that is computed based on a proportion of data points selected and overlapping geographical area. In some implementations, the geographical areas include (1244) one or more regions selected from the group consisting of: counties, states, and countries. In some implementations, the method further includes sorting and displaying (1246) various geographical areas based on the coverage metric. In some implementations, the geographical areas are displayed (1248) using a gradient color palette according to the coverage metric.

Figure 12J:
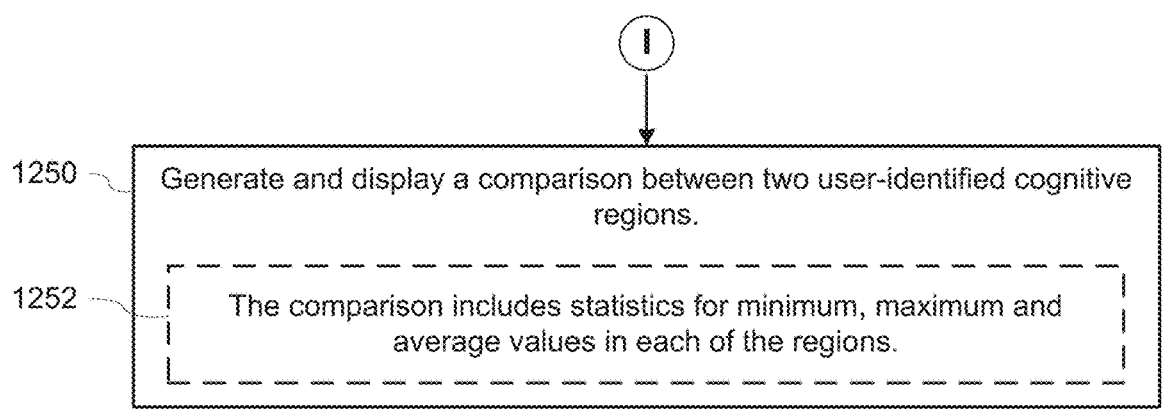

Referring next to FIG. 12J, in some implementations, the method further includes generating and displaying (1250) a comparison between two user-identified cognitive regions.

In some implementations, the comparison includes (1252) statistics for minimum, maximum and average values in each of the regions.

In this way, the techniques described herein can be used to provide graphical auto-completion to support querying cognitive regions of interest that cannot easily be represented in NL. A coverage metric is used to determine the user's regions of interest through direct manipulation, according to some implementations. The system allows for persisting the definitions of these cognitive regions where users can label, refine and incorporate them in future queries in the interface. An evaluation of the system indicates that participants found the system to be intuitive and appreciated the ability to specify vague geographic regions in their NL inquiry. Experimental results showed opportunities for using cognitive regions in richer geospatial data exploration.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of visual analysis of datasets, comprising:
at a computing system having a display, one or more processors and memory storing one or more programs configured for execution by the one or more processors:
receiving a first natural language input directed to a data source;
in response to receiving the first natural language input, and in accordance with a determination that the first natural language input specifies an incomplete natural language command directed to the data source:
presenting a map widget in a first region of a user interface for selecting geospatial data points from the data source, the map widget including a map having a plurality of predetermined geographic regions;
receiving user specification of a user-defined region in the map included in the map widget; and
in accordance with receiving the user specification, and based on a coverage metric computed for each geographic region of the plurality of geographic regions, the coverage metric representing a confidence level of selecting a particular predetermined geographic region, wherein the coverage metric for each geographic region is computed based on (i) a respective number of data points included in the user-defined region for the respective geographic region and (ii) a respective total number of data points in the respective geographic region:
identifying, by the computing system, one or more geographic regions of the plurality of predetermined geographic regions;
completing the natural language command with the identified one or more predetermined geographic regions;
generating and displaying a map data visualization, distinct from the map widget, according to the completed natural language command; and
displaying the map data visualization in a second region of the user interface, distinct from the first region.

2. The method of claim 1, wherein the coverage metric for each geographic region is computed based on a respective proportion of the respective geographic region that overlaps with the user-defined region.

3. The method of claim 1, wherein the user-defined region is either a rectangular selection or a free draw selection.

4. The method of claim 1, wherein the map widget includes an aggregated preview of data from the data source.

5. The method of claim 4, wherein the aggregated preview displays regions of a map as hexagons.

6. The method of claim 4, wherein the map widget further includes a detailed base map for additional spatial context.

7. The method of claim 1, wherein the plurality of predetermined geographic regions includes one or more regions, the one or more regions including one or more counties, one or more states, or one or more countries.

8. The method of claim 1, further comprising:
generating and displaying a comparison between two user-identified regions.

9. The method of claim 8, wherein the comparison includes statistics for minimum, maximum, and average values in each of a first user-defined region and a second user-defined region.

10. A computer system for visual analysis of datasets, comprising:
a display;
one or more processors; and
memory storing one or more programs configured for execution by the one or more processors, the one or more programs comprising instructions for:
receiving a first natural language input directed to a data source;
in response to receiving the first natural language input, and in accordance with a determination that the first natural language input specifies an incomplete natural language command directed to the data source:
presenting a map widget in a first region of a user interface for selecting geospatial data points from the data source, the map widget including a map having a plurality of predetermined geographic regions;
receiving user specification of a user-defined region in the map included in the map widget; and
in accordance with receiving the user specification, and based on a coverage metric computed for each geographic region of the plurality of geographic regions, the coverage metric representing a confidence level of selecting a particular predetermined geographic region, wherein the coverage metric for each geographic region is computed based on (i) a respective number of data points included in the user-defined region for the respective geographic region and (ii) a respective total number of data points in the respective geographic region:
identifying, by the computing system, one or more geographic regions of the plurality of predetermined geographic regions;
completing the natural language command with the identified one or more predetermined geographic regions;
generating and displaying a map data visualization, distinct from the map widget, according to the completed natural language command; and
displaying the map data visualization in a second region of the user interface, distinct from the first region.

11. The computer system of claim 10, wherein the one or more programs further comprise instructions for:
determining that the first natural language input specifies an incomplete natural language command by parsing the first natural language input to check for grammar parse tree errors.

12. The computer system of claim 10, wherein the one or more programs further comprise instructions for:
determining that the first natural language input specifies an incomplete natural language command by parsing the first natural language input to identify place-related tokens.

13. The computer system of claim 10, wherein the one or more programs further comprise instructions for:
generating and displaying a linguistic description of data points in the selected one or more geographic regions.

14. The computer system of claim 10, wherein the one or more programs further comprise instructions for:
continuing to display the selected one or more geographic regions in the map widget, wherein the map widget is configured to update the data visualization according to user modification of the selected one or more geographic regions.

15. A non-transitory computer readable storage medium storing one or more programs configured for execution by a computer system having a display, one or more processors, and memory, the one or more programs comprising instructions for:
receiving a first natural language input directed to a data source;
in response to receiving the first natural language input, and in accordance with a determination that the first natural language input specifies an incomplete natural language command directed to the data source:
presenting a map widget in a first region of a user interface for selecting geospatial data points from the data source, the map widget including a map having a plurality of predetermined geographic regions;
receiving user specification of a user-defined region in the map included in the map widget; and
in accordance with receiving the user specification, and based on a coverage metric computed for each geographic region of the plurality of geographic regions, the coverage metric representing a confidence level of selecting a particular predetermined geographic region, wherein the coverage metric for each geographic region is computed based on (i) a respective number of data points included in the user-defined region for the respective geographic region and (ii) a respective total number of data points in the respective geographic region:

identifying, by the computing system, one or more geographic regions of the plurality of predetermined geographic regions;

completing the natural language command with the identified one or more predetermined geographic regions; and generating and displaying a map data visualization, distinct from the map widget, according to the completed natural language command; and displaying the map data visualization in a second region of the user interface, distinct from the first region.

16. The non-transitory computer readable storage medium of claim 15, wherein the one or more programs further comprise instructions for:

receiving and storing a spatial definition of the user-defined region for use in future queries.

17. The non-transitory computer readable storage medium of claim 16, wherein the one or more programs further comprise instructions for:

receiving a spatial query directed to the data source; and retrieving the spatial definition to generate and display a response to the spatial query.

18. The non-transitory computer readable storage medium of claim 15, wherein the one or more programs further comprise instructions for:

sorting and displaying a subset of geographic regions of the plurality of predetermined geographic regions based on the coverage metric.

19. The non-transitory computer readable storage medium of claim 18, wherein the subset of geographic regions is displayed using a gradient color palette according to the coverage metric.

* * * * *